US012046799B2

(12) United States Patent
Ryu et al.

(10) Patent No.: US 12,046,799 B2
(45) Date of Patent: Jul. 23, 2024

(54) CONE ANTENNA ASSEMBLY

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR); Hyungjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/594,891

(22) PCT Filed: Sep. 30, 2019

(86) PCT No.: PCT/KR2019/012678
§ 371 (c)(1),
(2) Date: Nov. 2, 2021

(87) PCT Pub. No.: WO2021/066206
PCT Pub. Date: Apr. 8, 2021

(65) Prior Publication Data

US 2022/0255213 A1 Aug. 11, 2022

(51) Int. Cl.
*H01Q 1/24* (2006.01)
*H01Q 1/36* (2006.01)
*H01Q 9/04* (2006.01)

(52) U.S. Cl.
CPC ............... *H01Q 1/241* (2013.01); *H01Q 1/36* (2013.01); *H01Q 9/0407* (2013.01)

(58) Field of Classification Search
USPC .......................................................... 343/713
See application file for complete search history.

(56) References Cited

U.S. PATENT DOCUMENTS

| | | | | |
|---|---|---|---|---|
| 9,774,084 B2 * | 9/2017 | Xu | ........................ | H01Q 9/0464 |
| 10,074,909 B2 * | 9/2018 | Su | ........................ | H01Q 21/205 |

(Continued)

FOREIGN PATENT DOCUMENTS

| | | |
|---|---|---|
| KR | 101155715 | 6/2012 |
| KR | 101850061 | 6/2018 |
| KR | 101850061 B1 * | 6/2018 |

OTHER PUBLICATIONS

PCT International Application No. PCT/KR2019/012678, International Search Report dated Jun. 30, 2020, 4 pages.

*Primary Examiner* — Hoang V Nguyen
*Assistant Examiner* — Brandon Sean Woods
(74) *Attorney, Agent, or Firm* — LEE, HONG, DEGERMAN, KANG & WAIMEY

(57) ABSTRACT

Provided is a cone antenna assembly according to the present invention. The cone antenna assembly comprises: a first substrate; a second substrate which is spaced a certain distance from the first substrate and provided with a ground layer; a cone emitter which is provided between the first substrate and the second substrate and has an upper portion connected to the first substrate, a lower portion connected to the second substrate, and an opening section provided in the upper portion; and an antenna frame which is made of a dielectric material and configured to be fastened to the second substrate together with the cone emitter. The present invention can provide a cone antenna assembly that operates in a wide frequency bandwidth from a low frequency bandwidth to a 5G Sub 6 bandwidth, and enhance the convenience of assembling the cone antenna assembly.

18 Claims, 15 Drawing Sheets

(56) References Cited

U.S. PATENT DOCUMENTS

| | | | | |
|---|---|---|---|---|
| 11,387,547 | B2 * | 7/2022 | Nagaishi | H01Q 25/00 |
| 2010/0085264 | A1 | 4/2010 | Du et al. | |
| 2015/0357720 | A1 * | 12/2015 | Chen | H01Q 21/28<br>343/727 |
| 2016/0226145 | A1 | 8/2016 | Xu et al. | |
| 2018/0358697 | A1 * | 12/2018 | Zhou | H01Q 1/2291 |
| 2020/0350663 | A1 * | 11/2020 | Ambe | B60R 11/02 |

* cited by examiner (a)

(b)

CONE ANTENNA ASSEMBLY

CROSS-REFERENCE TO RELATED APPLICATIONS

This application is the National Stage filing under 35 U.S.C. 371 of International Application No. PCT/KR2019/012678, filed on Sep. 30, 2019, the contents of which is hereby incorporated by reference herein in its entirety.

TECHNICAL FIELD

The present disclosure relates to a cone antenna assembly. One particular implementation relates to a cone antenna assembly operating in the range from a low frequency band to a 5 GHz band, and an electronic device or vehicle having the same.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub 6 band under a 6 GHz band. In the future, it is also expected to provide 5G communication services by using a millimeter-wave (mmWave) band in addition to the Sub 6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub 6 frequency bands need to be disposed in a vehicle in addition an electronic device. However, the broadband antennas such as cone antennas have problems in that a vertical profile and a weight increase due to an increase in an overall antenna size, particularly, a height.

In addition, the broadband antennas such as the cone antennas may be implemented in a three-dimensional structure compared to the related art planar antennas. In addition, multiple input/multi output (MIMO) should be implemented to improve communication reliability and communication capacity in an electronic device or vehicle. To this end, it is necessary to arrange a plurality of broadband antennas in the electronic device or vehicle. Meanwhile, a cone radiator may be considered as an antenna that can be disposed in an electronic device or vehicle.

However, any detailed method for fixing and coupling such three-dimensional cone radiators to a circuit board and structures has not been considered.

DISCLOSURE OF INVENTION

Technical Problem

One aspect of the present disclosure is to solve the aforementioned problems and other drawbacks. Another aspect of the present disclosure is to fix and couple broadband antenna elements operating in frequency bands ranging from a low frequency band to a 5 GHz band to a circuit board and structures.

Still another aspect of the present disclosure is to provide convenience in assembling a cone antenna assembly including cone radiators.

Solution to Problem

To achieve these and other advantages and in accordance with the purpose of this specification, as embodied and broadly described herein, there is provided a cone antenna assembly. The cone antenna assembly may include a first substrate, a second substrate spaced apart from the first substrate by a predetermined distance and having a ground layer, a cone radiator provided between the first substrate and the second substrate, having an upper portion connected to the first substrate and a lower portion connected to the second substrate, and having an upper aperture, and an antenna frame formed of a dielectric material and fastened to the second substrate together with the cone radiator. Accordingly, the cone antenna assembly operating in wide frequency bands from a low frequency band to a 5G Sub 6 band can be provided and assembly convenience of the cone antenna assembly can be improved.

According to one implementation, the cone radiator may have the upper aperture and a lower aperture each formed in a circular shape, an oval shape, or a polygonal shape.

According to one implementation, the upper aperture and a lower aperture of the cone radiator may be formed in a rectangular shape. The antenna frame may be accommodated in the cone radiator. A supporter integrally formed with the antenna frame may be fastened to the second substrate to fix and support the cone radiator.

According to one implementation, the supporter may be connected to the second substrate through side apertures formed through side surfaces of the cone radiator, and the second substrate and the supporter may be fixed by fasteners inserted into the supporter from a rear surface of the second substrate.

According to one implementation, the cone radiator may be formed by press working, the antenna frame may be formed by injection molding, and a lower fixture integrally formed with the antenna frame may be fastened to the second substrate to fix and support the cone radiator.

According to one implementation, an outer fixture of the cone radiator may be fixed by being soldered on a ground formed on a bottom of the first substrate.

According to one implementation, a metal patch may be disposed on a front surface of the first substrate, such that a signal from the cone radiator is radiated by being coupled through to the metal patch. The metal patch may be disposed at the upper aperture of the cone radiator.

According to one implementation, the antenna frame may be formed by insert-injection to accommodate the cone radiator, and a plurality of bolt accommodating portions may be formed in the antenna frame. The first substrate and the antenna frame may be fixed by bolts accommodated in the bolt accommodating portions.

According to one implementation, the cone radiator may further include a plurality of outer rims defining the upper aperture of the cone radiator and connecting the cone radiator to the first substrate, and a plurality of bolt accommodating portions formed in the outer rims such that the outer rims are connected to the first substrate. The first substrate and the cone radiator may be fixed by a plurality of fasteners accommodated in the bolt accommodating portions.

According to one implementation, the second substrate and the antenna frame may be fixed by bolts accommodated in the plurality of bolt accommodating portions from a rear surface of the second substrate.

According to one implementation, the cone antenna assembly may further include a feeder disposed on the second substrate to transmit a signal through a lower aperture, and the feeder may be formed in a ring shape corresponding to a shape of the lower aperture.

According to one implementation, the feeder may be soldered on the second substrate, such that a signal from a signal line disposed on the second substrate is transmitted to the cone radiator through the feeder.

According to one implementation, a metal patch may be disposed on a front surface of the first substrate, such that a signal from the cone radiator is radiated by being coupled through to the metal patch, and the metal patch may be disposed at one side to surround at least part of the upper aperture of the cone radiator.

According to one implementation, the cone antenna assembly may further include a shorting pin configured to connect the metal patch and the ground formed on the second substrate, and the shorting pin may be provided as a single shorting pin to prevent a null of a radiation pattern from being generated in an elevation direction.

According to another aspect of the present disclosure, there is provided an electronic device having a cone antenna assembly. The electronic device may include a cone antenna assembly that includes a first substrate, a second substrate spaced apart from the first substrate by a predetermined distance and having a ground layer, a cone radiator provided between the first substrate and the second substrate, having an upper portion connected to the first substrate and a lower portion connected to the second substrate, and having an upper aperture, and an antenna frame formed of a dielectric material and fastened to the second substrate together with the cone radiator, and a transceiver circuit connected to the cone radiator through a feeder and configured to control a signal to be radiated through the cone radiator.

According to one implementation, the upper aperture and a lower aperture of the cone radiator may be formed in a rectangular shape. The antenna frame may be accommodated in the cone radiator. A supporter integrally formed with the antenna frame may be fastened to the second substrate to fix and support the cone radiator.

According to one implementation, the antenna frame may be formed by insert-injection to accommodate the cone radiator, and a plurality of bolt accommodating portions may be formed in the antenna frame. The first substrate and the antenna frame may be fixed by bolts accommodated in the bolt accommodating portions.

According to still another aspect of the present disclosure, there is provided a vehicle having a cone antenna assembly. The vehicle may include a cone antenna assembly that includes a first substrate, a second substrate spaced apart from the first substrate by a predetermined distance and having a ground layer, a cone radiator provided between the first substrate and the second substrate, having an upper portion connected to the first substrate and a lower portion connected to the second substrate, and having an upper aperture, and an antenna frame formed of a dielectric material and fastened to the second substrate together with the cone radiator, a transceiver circuit connected to the cone radiator through a feeder and configured to control a signal to be radiated through the cone radiator, and a baseband processor configured to perform communication with at least one of an adjacent vehicle, a Road Side Unit (RSU), and a base station via the transceiver circuit.

According to one implementation, the upper aperture and a lower aperture of the cone radiator may be formed in a rectangular shape. The antenna frame may be accommodated in the cone radiator. A supporter integrally formed with the antenna frame may be fastened to the second substrate to fix and support the cone radiator.

According to one implementation, the antenna frame may be formed by insert-injection to accommodate the cone radiator, and a plurality of bolt accommodating portions may be formed in the antenna frame. The first substrate and the antenna frame may be fixed by bolts accommodated in the bolt accommodating portions.

Advantageous Effects of Invention

The present disclosure can provide a structure capable of fixing and fastening a cone radiator to a circuit board and structures while providing a cone antenna assembly operating in wide frequency bands from a low frequency band to a 5G Sub 6 band.

Also, the present disclosure can provide a cone antenna assembly operating in wide frequency bands from a low frequency band to a 5G Sub 6 band and can improve assembly convenience of the cone antenna assembly.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1:
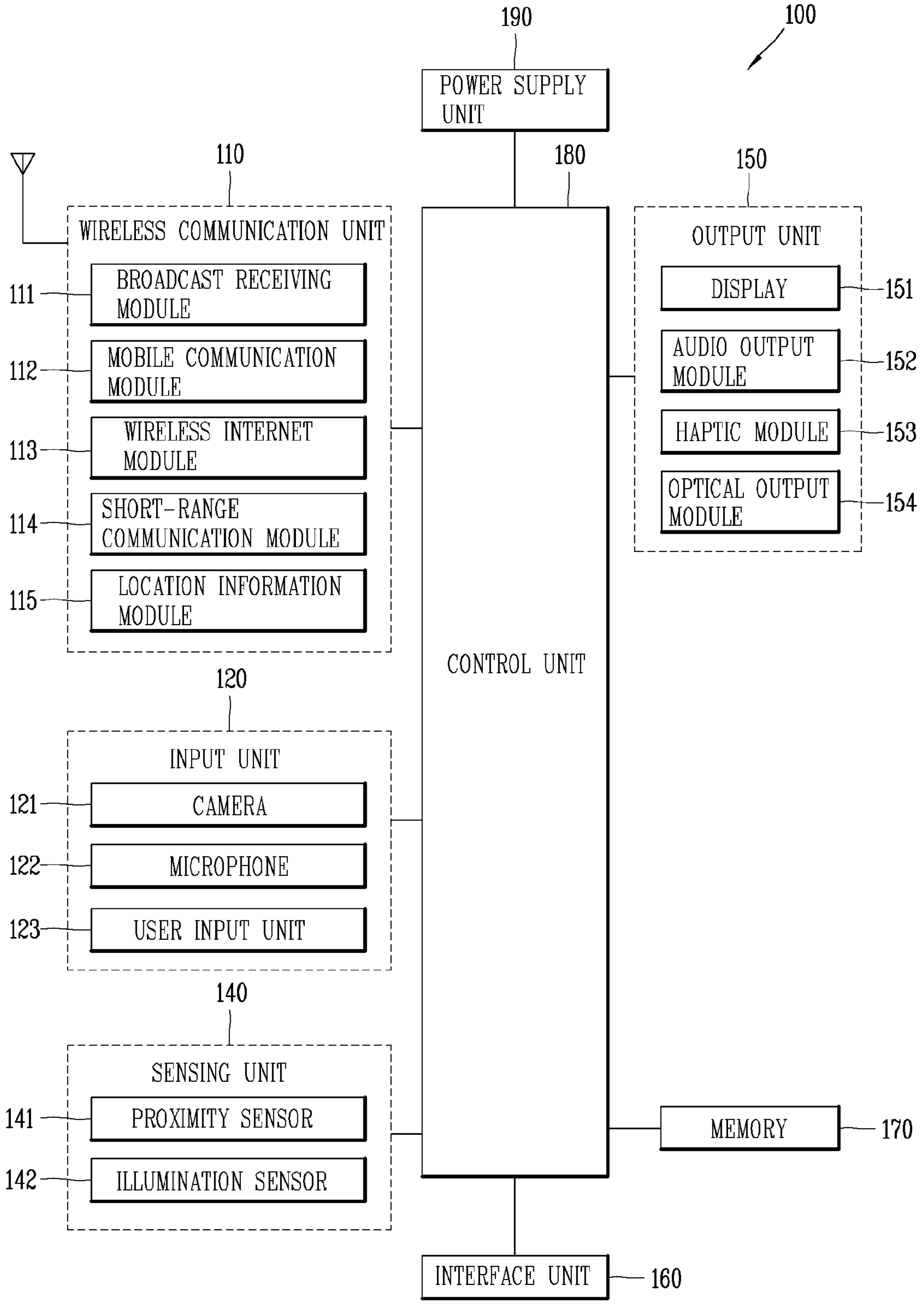
FIG. 1 is a block diagram of an electronic device in accordance with the present disclosure.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

On the other hand, an antenna system mounted in a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE refarming. Meanwhile, a sub-6 frequency band, which is a range of 6 GHz or less, may be used as the 5G frequency band.

On the other hand, a millimeter-wave (mmWave) range may be used as the 5G frequency band to perform broadband high-speed communication. When the mmWave band is used, the electronic device 100 may perform beamforming for communication coverage expansion with a base station.

On the other hand, regardless of the 5G frequency band, 5G communication systems can support a larger number of MIMO to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the portable electronic device may be implemented on the portable electronic device by an activation of at least one application program stored in the memory 170.

Figure 2A:
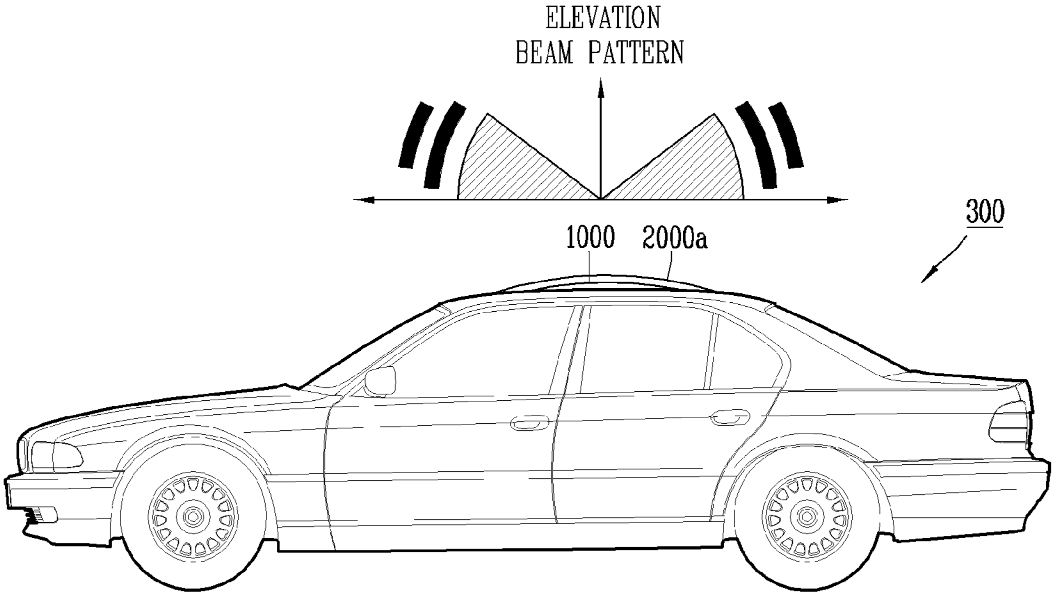
FIGS. 2A to 2C are views illustrating a structure for mounting an antenna system in a vehicle, which includes the antenna system mounted in the vehicle in accordance with the present disclosure.
Figure 2B:
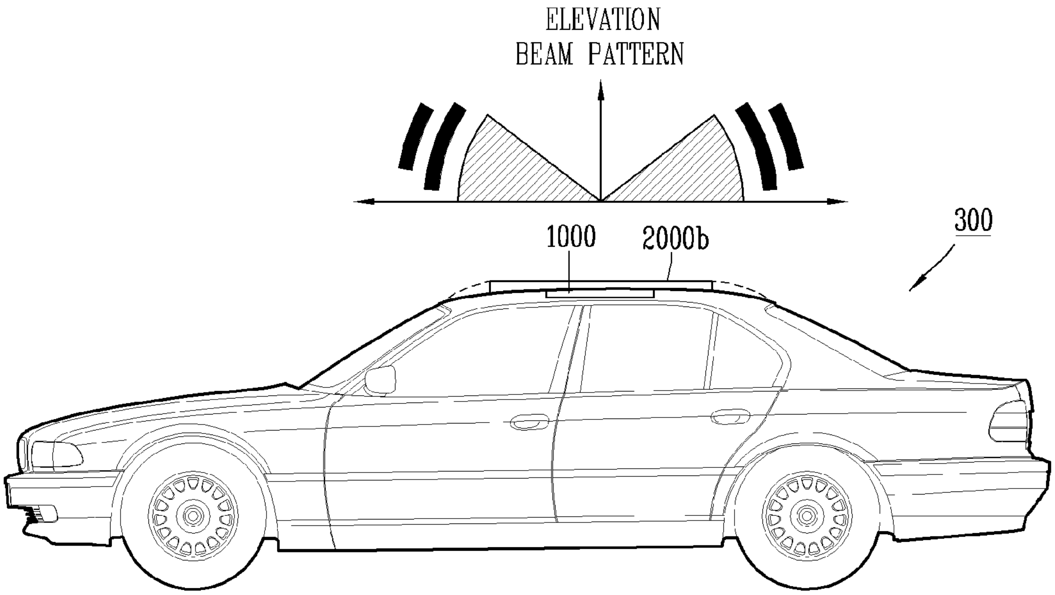
Figure 2C:
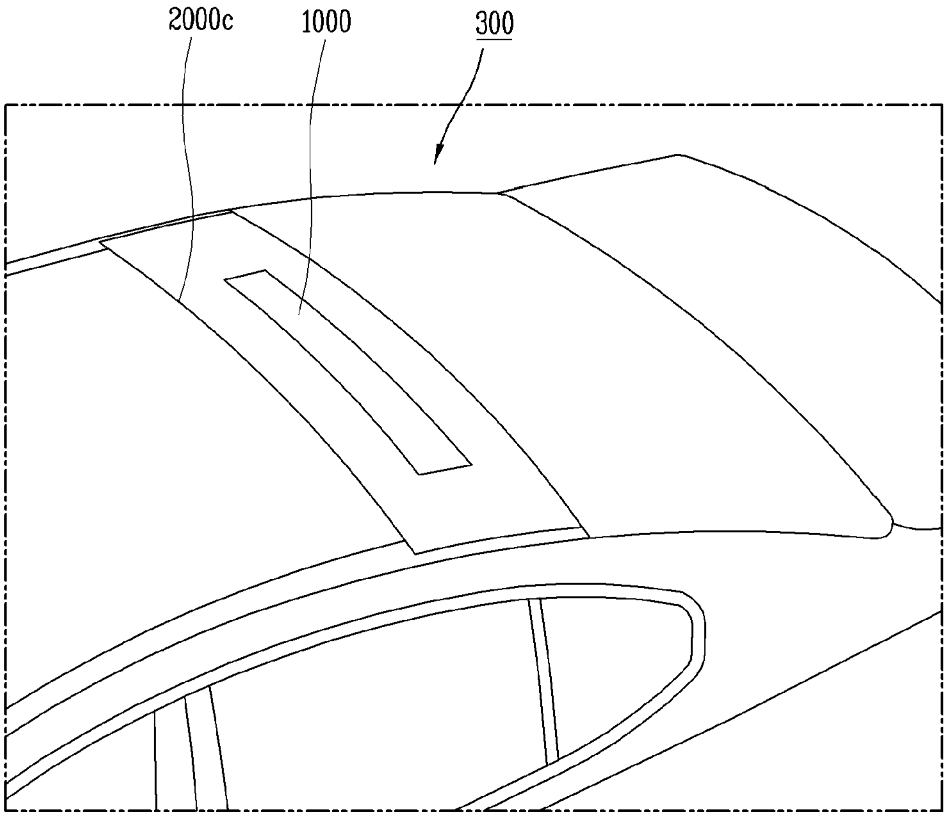

FIGS. 2A to 2C are views illustrating a structure for mounting an antenna system in a vehicle, which includes the antenna system mounted in the vehicle in accordance with the present disclosure. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted in a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication, while providing the existing mobile communication service (e.g., LTE).

Referring to FIG. 2A, the antenna system 1000 may be disposed on the roof of the vehicle. In FIG. 2A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to 2B, the antenna system 1000 may be disposed within a roof structure 2000*b* of the vehicle, and at least part of the roof structure 2000*b* may be made of a non-metallic material. At this time, the at least part of the roof structure 2000*b* of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000*c* of the vehicle, and at least part of the roof frame 200*c* may be made of a non-metallic material. At this time, the at least part of the roof frame 2000*c* of the vehicle may be realized as the non-metallic material, and may be made of a dielectric material through which radio signals are transmitted/received between the antenna system 1000 and the base station.

Figure 3:
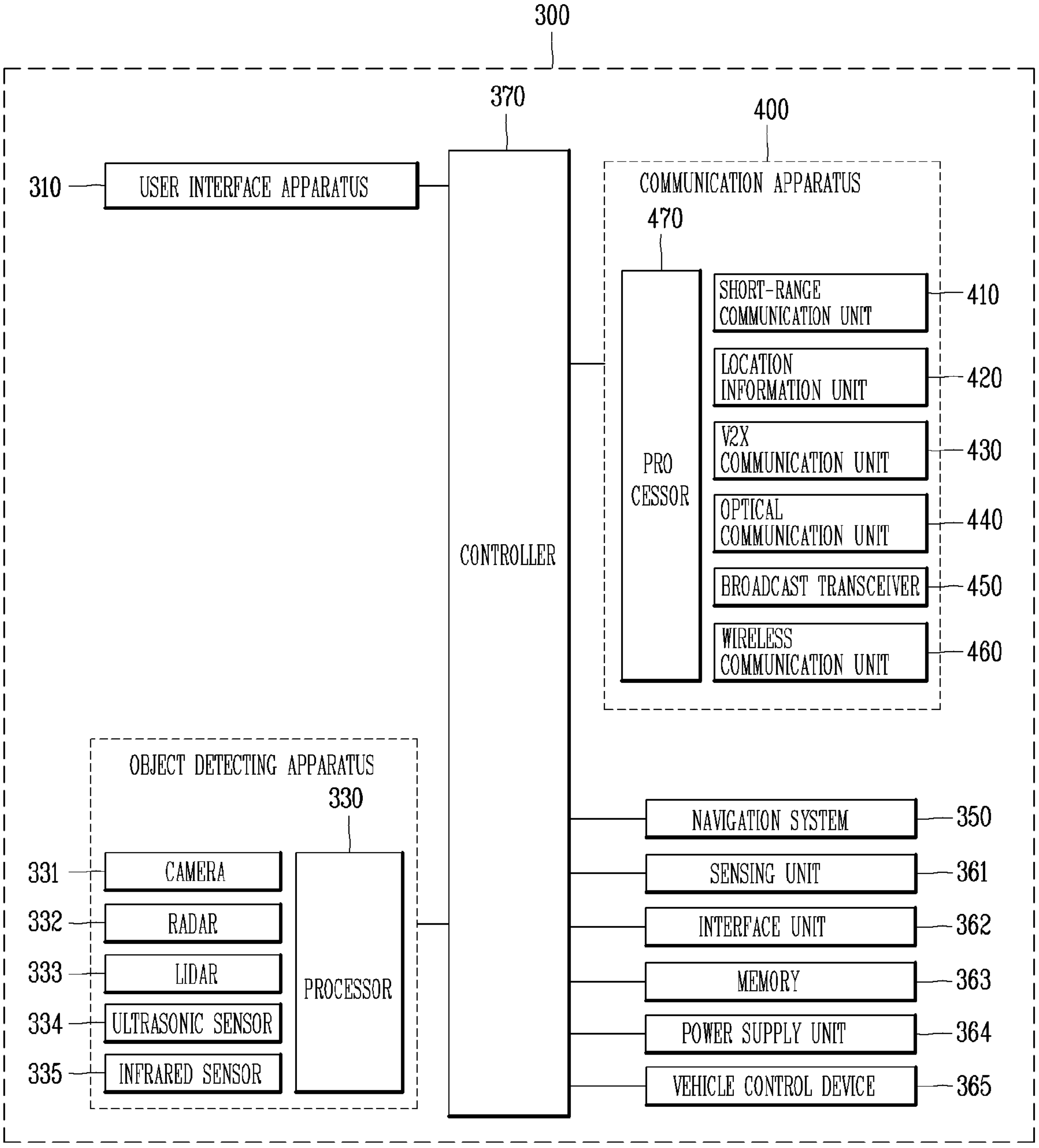
FIG. 3 is a block diagram illustrating a vehicle in accordance with an implementation of the present disclosure.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIG. 2A to 3, a vehicle 300 may include wheels turning by a driving force, and a steering apparatus 510 for adjusting a driving (ongoing, moving) direction of the vehicle 300.

The vehicle 300 may be an autonomous vehicle. The vehicle 300 may be switched into an autonomous mode or a manual mode based on a user input. For example, the vehicle 300 may be converted from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous module into the manual mode based on driving environment information generated in the object detecting apparatus 320.

In an example, the vehicle 300 may be switched from the manual mode into the autonomous mode or from the autonomous module into the manual mode based on driving environment information received through a communication apparatus 400. The vehicle 300 may be switched from the manual mode into the autonomous mode or from the autonomous module into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 3, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus 320 may be an apparatus for detecting an object located at outside of the vehicle 300. The object may be a variety of objects associated with driving (operation) of the vehicle 300. Meanwhile, objects may be classified into moving objects and fixed objects. For example, the moving objects may include other vehicles and pedestrians. The fixed objects may include traffic signals, roads, and structures, for example.

The object detecting apparatus 320 may include a camera 321, a radar 322, a LiDAR 323, an ultrasonic sensor 324, an infrared sensor 325 and a processor 330.

According to an implementation, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an implementation, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a route guidance service to a destination based on current location information related to the vehicle. In addition, the navigation system 350 may provide guidance information related to surroundings of the vehicle based on information obtained through the object detecting apparatus 320 and/or a V2X communication unit 430. Meanwhile, guidance information, autonomous driving service, etc. may be provided based on V2V, V2I, and V2X information obtained through a wireless communication unit 460 operating together with the antenna system 1000 according to the present disclosure.

The object detecting apparatus 320 may operate according to the control of a controller 370.

The communication apparatus 400 may be an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 may be a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 300 and at least one external device. The location information unit 420 may be a unit for acquiring location information.

For example, the location information unit 420 may include a Global Positioning System (GPS) module or a Differential Global Positioning System (DGPS) module.

The V2X communication unit 430 may be a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing communication protocols such as vehicle-to-infra (V2I), vehicle-to-vehicle (V2V), and vehicle-to-pedestrian (V2P).

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The wireless communication unit 460 may be a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
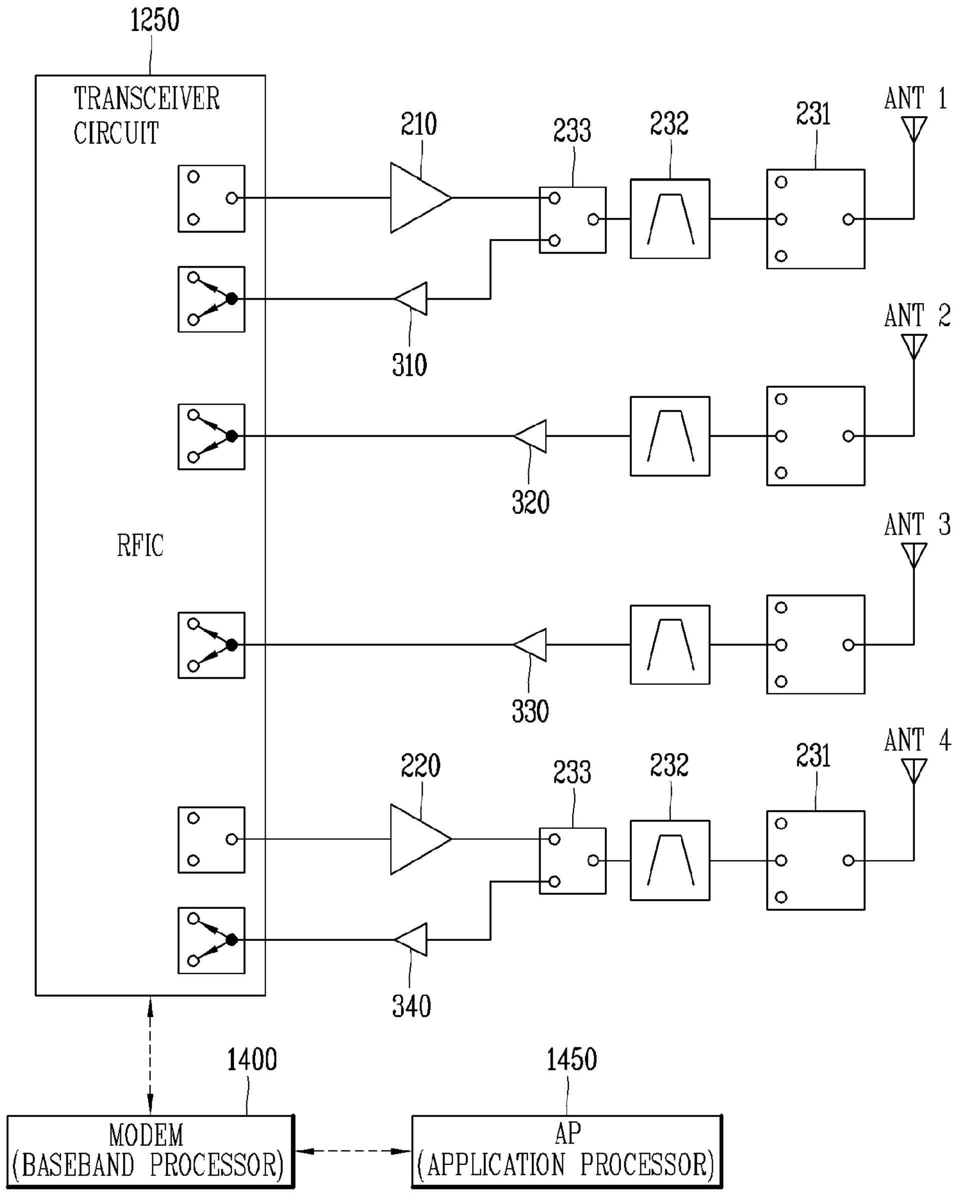
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 210*a* to 240*a* in the receiver. Here, the first power amplifier 210, the second power amplifier 220, the RFIC 1250, and the plurality of low noise amplifiers 210*a* to 40*a* may all be operable in the first communication system and the second communication system. In this case, the first communication system and the second communication system may be a 4G communication system and a 5G communication system, respectively.

As illustrated in FIG. 2, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and also there may be an advantage that control signaling by the modem 1400 can be simplified.

On the other hand, when the RFIC 1250 is configured as the 4G/5G separate type, it may be referred to as a 4G RFIC and a 5G RFIC, respectively. In particular, when t5G band and 4G band have a large difference in bands, such as when the 5G band is in a millimeter wave band, the RFIC 1250 may be configured as the 4G/5G separate type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when the electronic device is determined to be in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC, and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in either the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mmWave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in a form of a double-pole double-throw (DPDT) to connect or block the transmission signal and the reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in a specific time interval. In addition, the RFIC 1250 may control reception circuits including the first to fourth low noise amplifiers 310 to 340 to receive a 4G signal or a 5G signal in a specific time interval.

Hereinafter, a description will be given of an antenna system mounted in the electronic device or vehicle according to FIGS. 2A to 4, a broadband antenna (e.g., a cone radiator) capable of operating in frequency bands ranging from a low frequency band to about a 5 GHz band, and a cone antenna assembly including the same. Here, the electronic device may include a communication relay apparatus such as a Customer Premises Equipment (CPE) in addition to a mobile terminal.

Figure 5A:
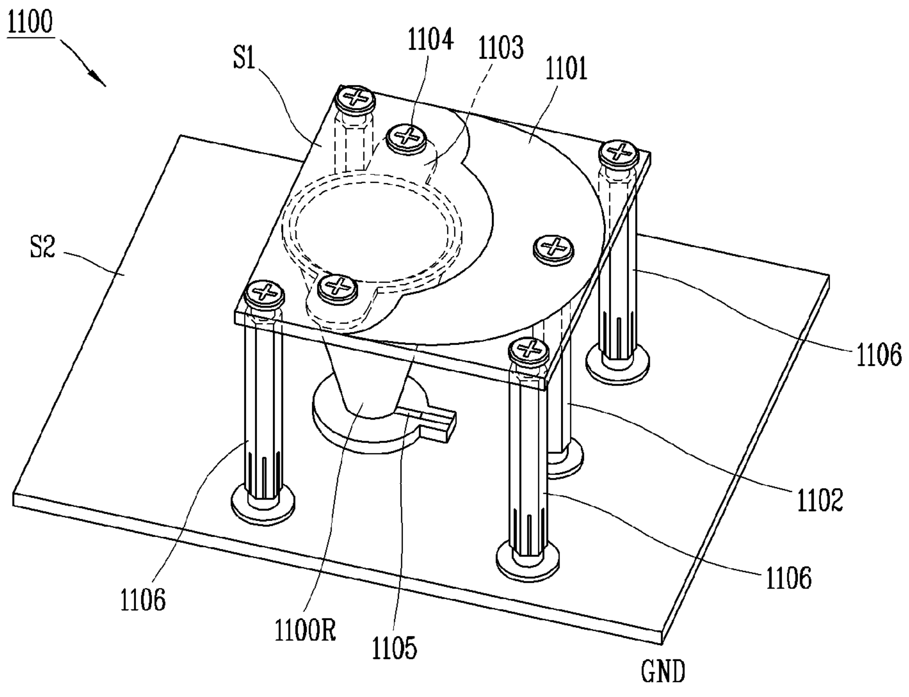
FIG. 5A is a perspective view of a three-dimensional structure of a cone antenna according to the present disclosure and FIG. 5B is a lateral view of the three-dimensional structure of the cone antenna according to the present disclosure.
Figure 5B:
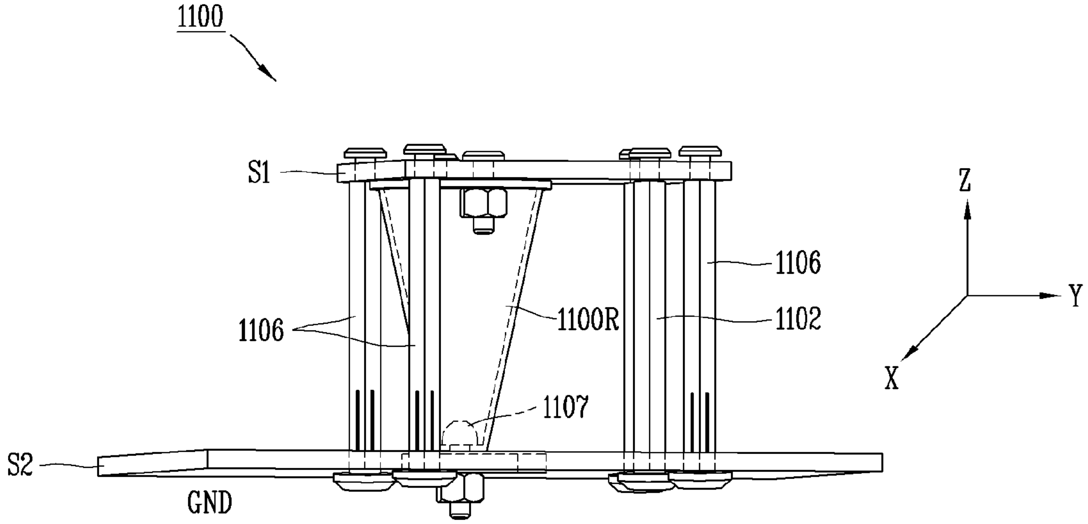

In this regard, FIGS. 5A and 5B illustrate a detailed structure of a broadband antenna (e.g., a cone antenna) capable of operating in frequency bands ranging from a low frequency band to about a 5 GHz band according to one implementation of the present disclosure. FIG. 5A is a perspective view of a three-dimensional structure of a cone antenna according to the present disclosure. FIG. 5B is a lateral view of the three-dimensional structure of the cone antenna according to the present disclosure.

A shape of an upper aperture of a cone radiator (or cone emitter) 1100R according to the present disclosure may be configured in a circular shape, an oval shape, or any polygonal shape. In this regard, when the upper aperture of the cone radiator 1100R has a rectangular shape, corners of the upper aperture may be rounded for manufacturing convenience. Alternatively, the upper aperture of the cone radiator 1100R may have an oval shape in which a circular aperture is linearly moved by a predetermined distance.

Referring to FIGS. 5A and 5B, an electronic device or vehicle having a cone antenna according to the present disclosure may include a cone antenna 1100. Here, since the cone radiator 1100R is fastened to a first substrate S1 as an upper substrate and a second substrate S2 as a lower substrate to constitute the cone antenna 1100, it may be referred to as a cone antenna assembly 1100.

Specifically, the cone antenna 1100 may include a first substrate S1 corresponding to an upper substrate, a second substrate S2 corresponding to a lower substrate, and a cone radiator 1100R. In addition, the cone antenna 1100 may further include a metal patch 1101, a shorting pin 1102, and a feeder 1105.

Also, the cone antenna 1100 may further include an outer rim 1103 and a fastener 1104 to be fixed to the first substrate S1 through the outer rim 1103. In addition, the cone antenna 1100 may further include non-metal supporters 1106, and a fastener 1107 for fastening the feeder 1105. Here, the fasteners 1104 and 1107 may be implemented as fasteners such as screws having predetermined diameters.

In this regard, the second substrate S2 may be spaced apart from the first substrate S1 by a predetermined interval, and may include a ground layer GND. Meanwhile, the cone radiator 1100R may be disposed between the first substrate S1 and the second substrate S2. Specifically, the cone radiator 1100R may allow the first substrate S1 and the second substrate S2 to be vertically connected to each other. In addition, the cone radiator 1100R may have an upper portion connected to the first substrate S1 and a lower portion connected to the second substrate S2, and an upper aperture may be formed through the upper portion.

Meanwhile, the metal patch 1101 may be disposed on the first substrate S1 to be spaced apart from the upper aperture. Specifically, an inner side of the metal patch 1101 may be formed in a circular shape to correspond to a shape of an outline of the upper aperture. With the configuration, a signal radiated from the cone radiator 1100R can be coupled through the inner side of the metal patch 1101.

The metal patch 1101 may be disposed at only one side to surround a partial area of the upper aperture of the cone antenna 1100. Accordingly, an overall size of the cone antenna 1100 including the metal patch 1101 can be minimized.

The shorting pin 1102 may be provided to electrically connect the metal patch 1101 and the ground layer GND of the second substrate S2. On the other hand, the shorting pin 1102 can be implemented in a structure in which a fastener such as a screw having a predetermined diameter is inserted into a structure such as a dielectric.

In this regard, in order to arrange a plurality of cone antennas in an electronic device, the cone antennas need to be implemented in a small size. A cone antenna structure according to the present disclosure for this purpose may be referred to as "Cone with shorting pin" or "Cone with shorting supporter".

The number of shorting pins or shorting supporters may be one or two. Specifically, the number of shorting pins or shorting supports may not be limited thereto and may vary depending on applications. However, in the "Cone with shorting pin" or "Cone with shorting supporter" structure according to the present disclosure, one or two shorting pins or shorting supporters may be provided to reduce the size of the antenna.

Specifically, one shorting pin 1102 may be provided between the metal patch 1101 and the second substrate S2. Such a single shorting pin 1102 can prevent generation of a null of a radiation pattern of the cone antenna. An operating principle and technical characteristics related to this will be described in detail later with reference to FIGS. 7A and 7B.

In this regard, a typical cone antenna has a problem in that a null of a radiation pattern is generated in a boresight in an elevation (angle) direction so as to deteriorate reception performance. In order to solve this problem, in the present disclosure, the null of the radiation pattern in the boresight in the elevation direction can be removed by the structure in which the cone antenna 1110 is connected to the single shorting pin 1102. Accordingly, reception performance can be improved in almost all directions in the present disclosure.

Referring to FIG. 4A, the cone antenna with the one shorting pin may define a current path of the feed unit 1105—the cone radiator 1100R—the metal patch 1101—the shorting pin 1102—the ground layer GND. In this way, through the asymmetric current path of the feeder 1105—the cone radiator 1100R—the metal patch 1101—the shorting pin 1102—the ground layer GND, the generation of the null of the radiation pattern in the boresight in the elevation direction can be prevented.

The feeder 1105 may be disposed on the second substrate S2 to transmit a signal through a lower aperture. To this end, the feeder 1105 may have an end portion formed in a ring shape to correspond to a shape of a lower aperture.

On the other hand, the cone antenna according to the present disclosure may further include at least one non-metal supporter 1106 to mechanically fix the cone radiator 1100R, the first substrate S1, and the second substrate S2. To this end, the non-metal supporter 1106 may vertically connect the first substrate S1 and the second substrate S2 to support the first substrate S1 and the second substrate S2. On the other hand, since the non-metal supporter 1106 is not a metal and is not electrically connected to the metal patch 1101, the non-metal supporter 1106 may not affect electrical characteristics of the cone antenna 1100. Accordingly, the non-metal supporter 1106 may be disposed between the first and second substrates S1 and S2 on each of a left upper portion, a right upper portion, a left lower portion, and a right lower portion, so as to vertically connect and support the first substrate S1 and the second substrate S2. However, the present disclosure may not be limited thereto, and various structures capable of supporting the first substrate S1 and the second substrate S2 may be applied depending on applications.

Meanwhile, the outer rim 1103 may be integrally formed with the cone radiator 1100R, and may be connected to the first substrate S1 by the fastener 1104. Here, the outer rim 1103 may be provided by two on opposite points of the cone radiator 1100R.

On the other hand, the fastener 1107 may be fastened to the second substrate S2 through an inside of the end portion (i.e., the ring shape) of the feeder 1105. Accordingly, the second substrate S2 having the feeder 1105 can be fixed to the cone radiator 1100R by the fastener 1107. Therefore, the fastener 1107 can serve to fix the cone radiator 1100R to the second substrate S2 as well as transmitting a signal to the cone radiator 1100R.

Figure 6:
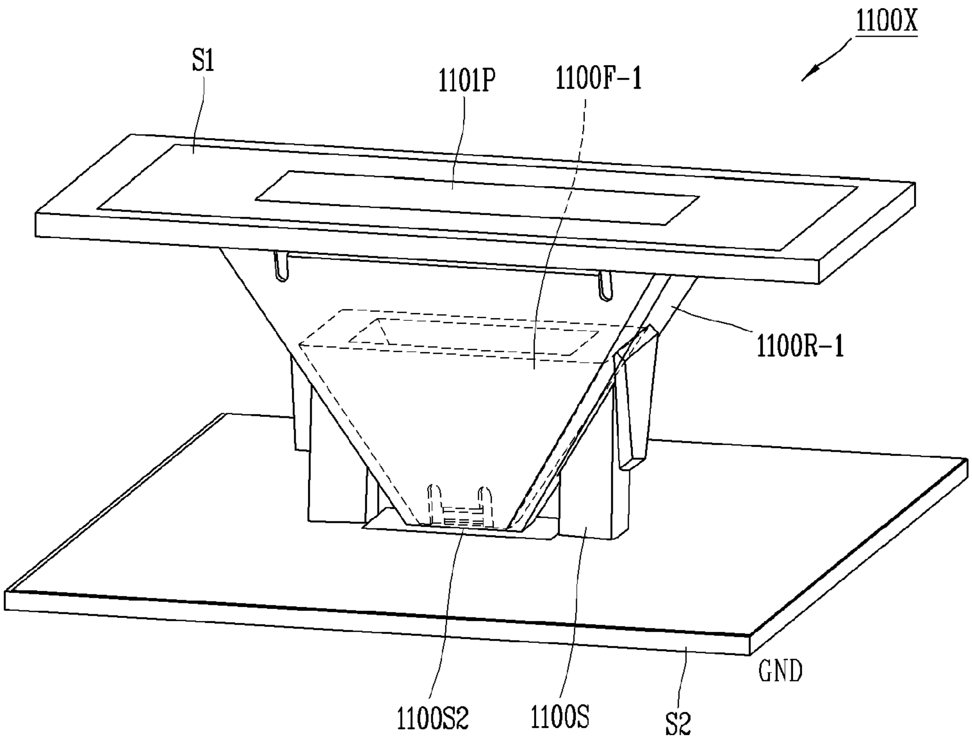
FIG. 6 is a perspective view illustrating a cone antenna assembly having a cone radiator in accordance with one implementation.
Figure 7:
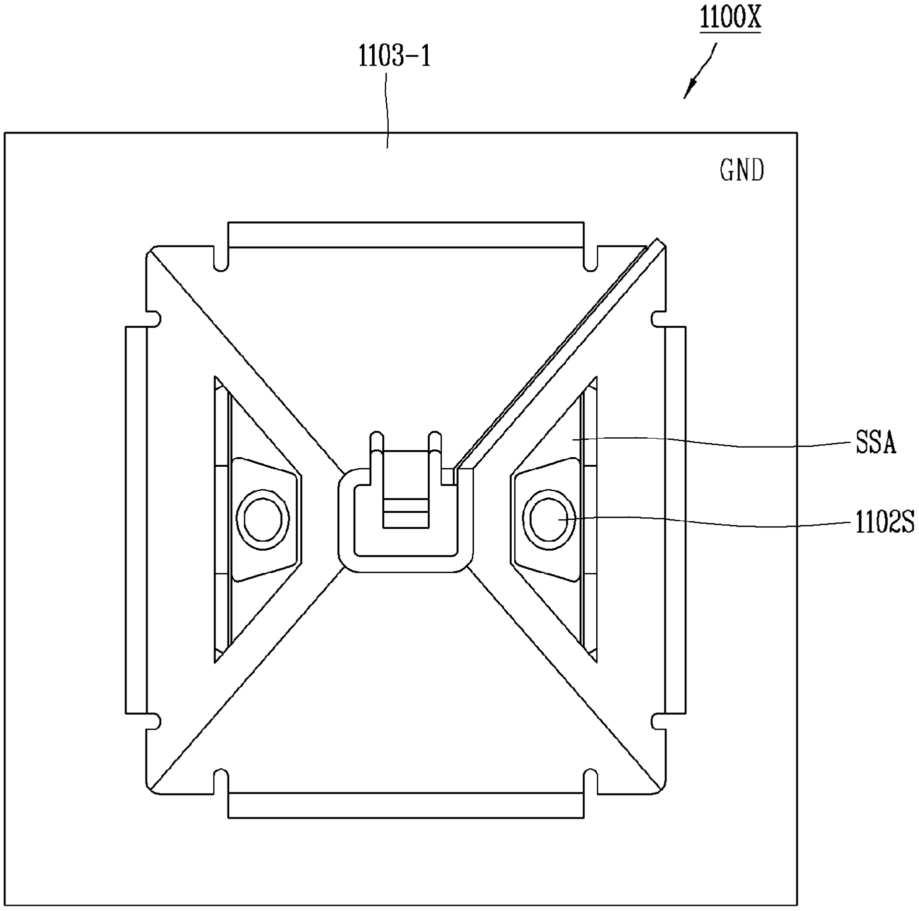
FIG. 7 is a view illustrating a structure in which the cone radiator of FIG. 6 is coupled to an upper substrate and a lower substrate.

In this regard, FIG. 6 is a perspective view illustrating a cone antenna assembly having a cone radiator in accordance with one implementation. FIG. 7 is a view illustrating a structure in which the cone radiator of FIG. 6 is fastened to an upper substrate and a lower substrate. A cone antenna assembly 1100X according to one implementation of the present disclosure may have an assembly structure which considers structural stability and robustness as well as manufacturing convenience when manufacturing the aforementioned cone antenna 1000.

Referring to FIGS. 6 and 7, the cone antenna assembly 1100X may have a structure in which a cone radiator 1100R-1 is fastened to a first substrate S1 as an upper substrate and a second substrate S2 as a lower substrate. Specifically, the second substrate S2 may be spaced apart from the first substrate S1 by a predetermined interval, and may include a ground layer GND. Here, the first substrate S1 as the upper substrate and the second substrate S2 as the lower substrate may be referred to as "TOP PCB" and "BOTTOM PCB", respectively.

Meanwhile, the first substrate S1 and the second substrate S2 may be substrates having a high dielectric constant of FR4, but may not be limited thereto. In order to improve radiation efficiency of a metal patch 1101P disposed on the first substrate S1, a low loss substrate having a lower dielectric constant than that of the FR4 substrate may be used.

In addition, the cone radiator 1100R-1 may be provided between the first substrate S1 and the second substrate S2 and have an upper portion connected to the first substrate S1 and a lower portion connected to the second substrate S2. An upper aperture may be formed through the upper portion. Meanwhile, the cone radiator 1100R-1 of FIGS. 6 and 7 may have an upper aperture and a lower aperture each formed in a rectangular shape. However, the shapes of the upper aperture and the lower aperture of the cone radiator 1100R-1 may not be limited thereto, and may be configured in a circular shape, an oval shape or an arbitrary polygonal shape. In this regard, when the upper aperture of the cone radiator 1100R-1 has a rectangular shape, corners of the upper aperture may be rounded for manufacturing convenience. Alternatively, the upper aperture of the cone radiator 1100R-1 may have an oval shape in which a circular aperture is linearly moved by a predetermined distance.

Meanwhile, the cone antenna assembly 1100X according to the present disclosure may include an antenna frame 1100F-1 to be fastened to the first substrate S1 and/or the second substrate S2 together with the cone radiator 1100R-1.

In this regard, the antenna frame 1100F-1 may be formed of a dielectric material, and may be fastened to the second substrate S2 together with the cone radiator 1100R-1. Specifically, the antenna frame 1100F-1 may be accommodated inside the cone radiator 1100R-1. Also, a supporter 1100S that is integrally formed with the antenna frame 1100F-1 may be fastened to the second substrate S2, thereby fixing and supporting the cone radiator 1100R-1.

The supporter 1100S may be connected to the second substrate S2 through side surface apertures SSA formed through side surfaces of the cone radiator 1100R-1. In addition, the second substrate S2 and the supporter 1100S may be fixed by fasteners 1102S inserted into the supporter 1100S through a rear surface of the second substrate S2. Accordingly, the second substrate S2 as the lower substrate and the antenna frame 1100F-1 can be fastened to each other by screws corresponding to the fasteners 1102S.

In this regard, at least one of the fasteners 1102S inserted into the supporter 1100S integrally formed with the antenna frame 1100F-1 may be a metal screw. Accordingly, the metal screw as the at least one fastener 1102S may operate as a shorting pin. Therefore, in regard to a cone antenna radiation pattern by the cone antenna assembly 1100X, reception performance can be enhanced because a null pattern at a boresight in an elevation direction can be alleviated.

On the other hand, when the antenna system including the cone antenna assembly 1100X is mounted in a vehicle, reception performance in a horizontal direction may be more important than reception performance at a boresight (vertical direction) in an elevation direction. When the antenna system including the cone antenna assembly 1100X is disposed in the vehicle as described above, the two fasteners 1102S inserted into the supporter 1100S may all be configured as metal screws.

Meanwhile, the cone radiator 1100R-1 according to the present disclosure may be formed by press working. However, the present disclosure may not be limited thereto, and the cone radiator 1100R-1 may be manufactured in the form of a mold. On the other hand, the antenna frame 1100F-1 according to the present disclosure may be formed by injection molding. Accordingly, a lower fixture 1100S2 integrally formed with the antenna frame 1100F-1 may be mechanically fastened to the second substrate S2 to fix and support the cone radiator 1100R-1.

An outer fixture 1103-1 of the cone radiator 1100R-1 may be fixed by being soldered on the ground GND formed on a lower portion of the first substrate S1.

The metal patch 1101P may be disposed on a front surface of the first substrate S1 so that a signal from the cone radiator 1100R-1 can be radiated by being coupled to the metal patch 1101P. However, the metal patch 1101P may not be disposed only on a front surface of the first substrate S1 but may also be disposed on a rear surface of the first substrate S1.

With respect to the position where the metal patch 1101P is disposed, the metal patch 1101P may be disposed on the upper aperture of the cone radiator 1100R-1. However, the present disclosure may not be limited thereto and the metal patch 1101P may alternatively be disposed along a side surface of the cone radiator 1100R-1, as illustrated in FIGS. 5A and 5B.

Figure 8:
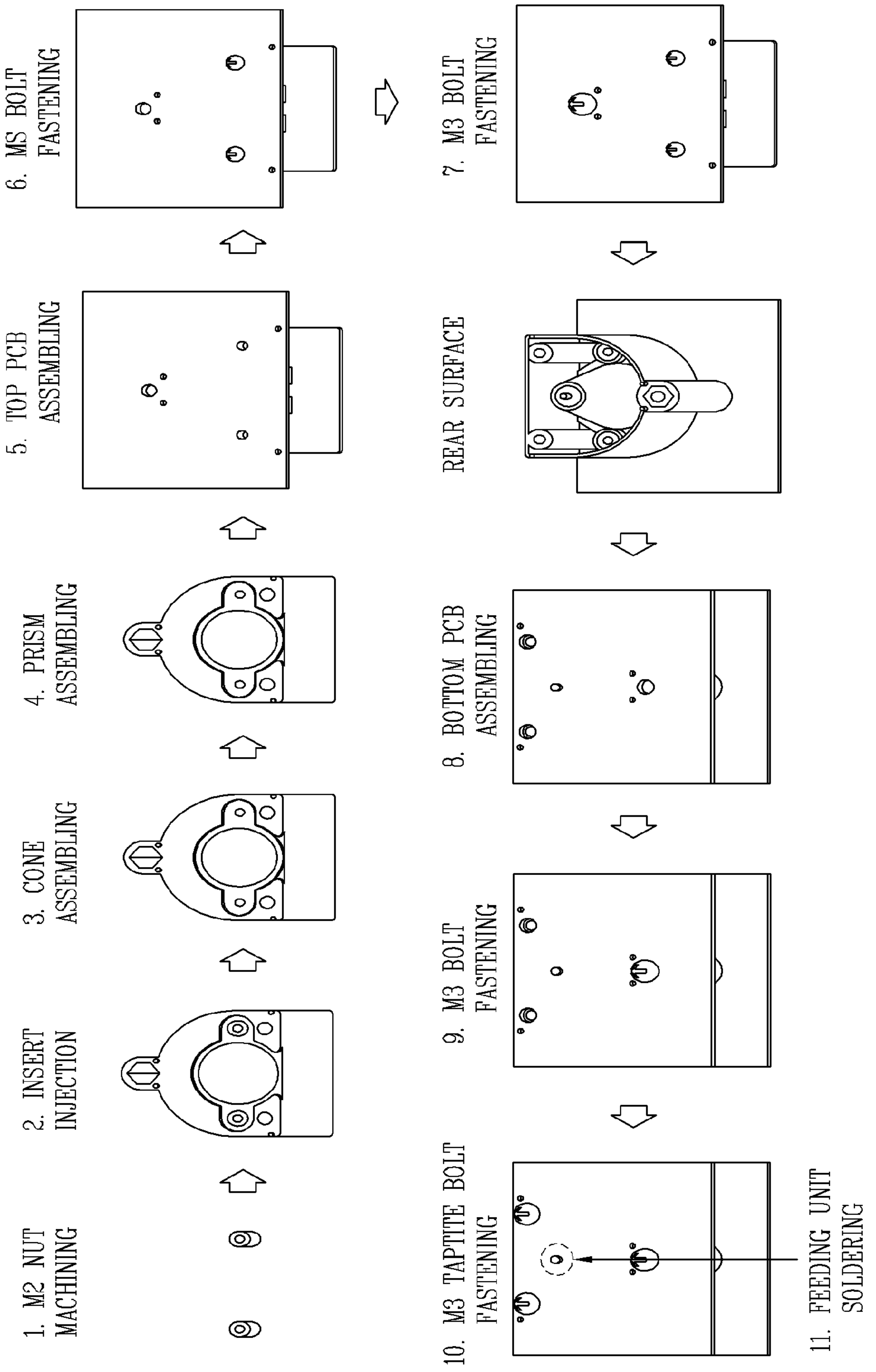
FIG. 8 is a view illustrating a process of assembling a cone antenna assembly having a cone radiator in accordance with another implementation.
Figure 9:
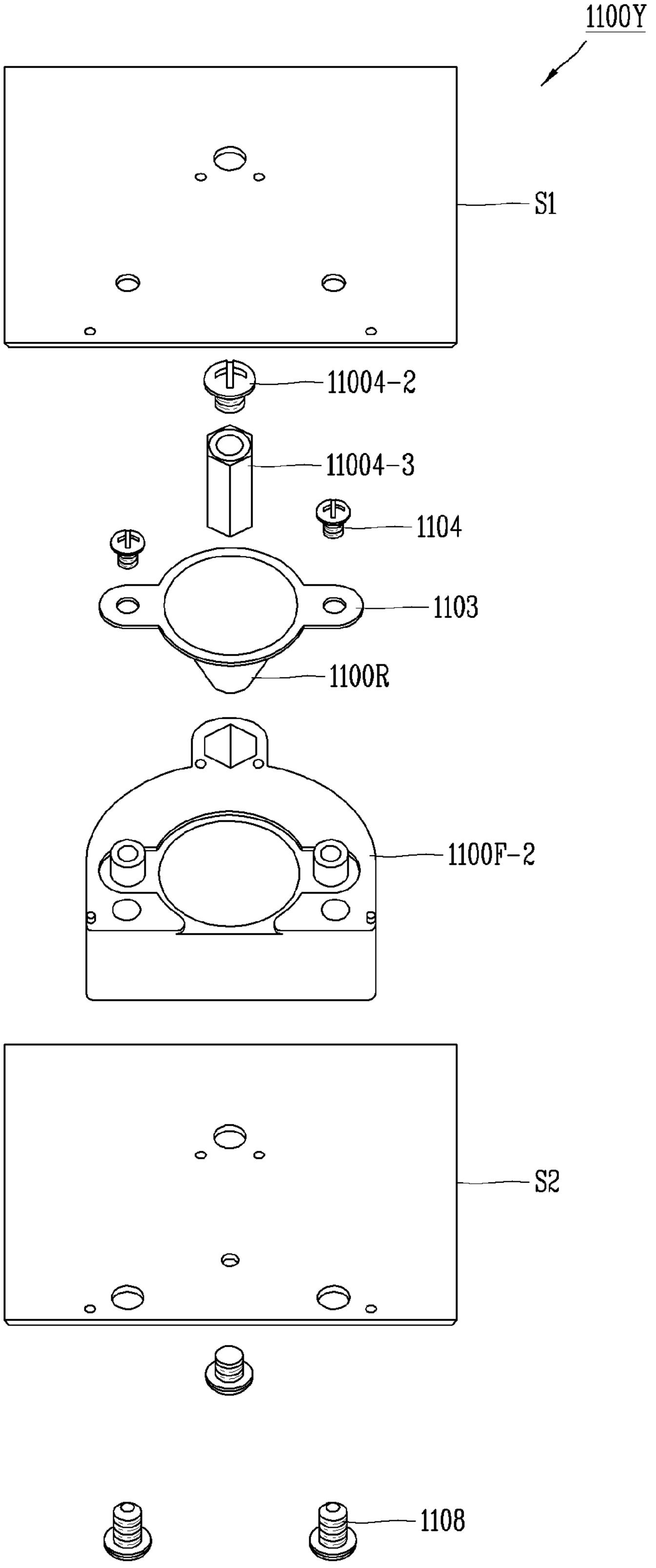
FIG. 9 is an exploded view of the cone antenna assembly having the cone radiator of FIG. 8.

FIG. 8 is a view illustrating a process of assembling a cone antenna assembly having a cone radiator in accordance with another implementation. FIG. 9 is an exploded view of the cone antenna assembly having the cone radiator of FIG. 8.

Referring to FIG. 8, the assembling process of the cone antenna assembly including the cone radiator may include NUT machining (S1), INSERT-injection (S2), CONE assembling (S3), PRISM assembling (S4), TOP PCB assembling (S5), and BOLT fastening (S6). However, the assembling process may not be limited to the aforementioned order of NUT assembling (S1) to M2 BOLT fastening (S6), and the order may vary depending on applications.

Meanwhile, the assembling process of the cone antenna assembly including the cone radiator may further include M3 BOLT fastening (S7), BOTTOM PCB assembling (S8), M3 BOLT fastening (S9), and M3 TAPTITE BOLT fastening (S10) and FEEDER soldering (S11). However, the assembling process may not be limited to the aforementioned order of M3 BOLT fastening (S7) to FEEDER soldering (S11), and the order may vary depending on an application.

Referring to FIG. 9, a cone antenna assembly 1100Y may be configured such that a cone radiator 1100R is fastened to a first substrate S1 as an upper substrate and a second substrate S2 as a lower substrate. An antenna frame 1100F-2 may be formed by insert-injection to accommodate the cone radiator 1100R. In this case, a plurality of bolt accommodating portions may be formed in the antenna frame 1100F-2, and the first substrate S1 and the antenna frame 1100F-2 may be fixed by bolts accommodated in the bolt accommodating portions. Here, the number of bolt accommodating portions formed in the antenna frame 1100F-2 may be three but may not be limited thereto and may vary depending on applications.

The cone radiator 1100R may have an upper aperture and include a plurality of outer rims 1103 for connecting the cone radiator 1100R to the first substrate S1. The cone radiator 1100R may further include a plurality of bolt accommodating portions formed in the outer rims 1103 to connect the outer rims 1103 and the first substrate S1. Accordingly, the first substrate S1 and the cone radiator 1100R can be fixed by a plurality of fasteners 1104 accommodated in the bolt accommodating portions.

On the other hand, the first substrate S1 and the cone radiator 1100R may be fixed by the fasteners 1104 that are inserted into the bolt accommodating portions formed in the antenna frame 1100F-2 at positions corresponding to the outer rims 1103. In addition, a fastener 11004-2 inserted through the first substrate S1 may be fastened to a top prism 11004-3. Accordingly, the top prism 11004-3 may be inserted into another accommodating portion formed in the antenna frame 1100F-2 by using the fastener 11004-2.

Meanwhile, the second substrate S2 and the antenna frame 1100F-2 may be fixed by bolts 1108, which are accommodated in a plurality of bolt accommodating portions of the antenna frame 1100F-2 from the rear surface of the second substrate S2. In this regard, positions of the plurality of bolt accommodating portions formed in a top of the antenna frame 1100F-2 and positions of the plurality of bolt accommodating portions formed in a bottom of the antenna frame 1100F-2 may be the same as each other. Accordingly, manufacturing convenience of the antenna frame 1100F-2 formed by the insert-injection can be improved.

On the other hand, the positions of the plurality of bolt accommodating portions formed in the top of the antenna frame 1100F-2 and the positions of the plurality of bolt accommodating portions formed in the bottom of the antenna frame 1100F-2 may be different from each other to maximize structural stability. This may result in improving structural stability and robustness of the cone antenna assembly 1100Y in which the cone radiator 1100R is fastened to the first substrate S1 and the second substrate S2 through the antenna frame 1100F-2.

Referring to FIGS. 5A to 9, the metal patches 1101 and 1101P of the cone antenna assemblies 1100X and 1100Y may be configured as rectangular patches or circular patches (arbitrary polygonal patches) depending on applications. The metal patches 1101 and 1101P may be disposed to overlap the cone radiators 1100R and 1100R-1, may be disposed only on one side, or may be disposed on both of one side and another side.

In this regard, FIGS. 10A to 11B illustrate shapes and arrangements of metal patches according to various examples of the present disclosure.

Figure 10A:
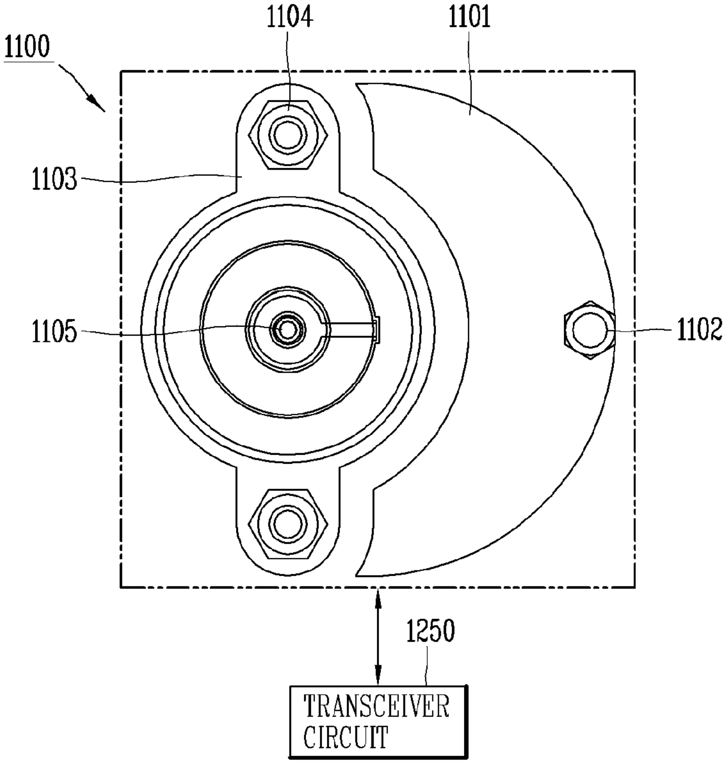
FIGS. 10A and 10B are front views illustrating a cone antenna having a "Cone with single shorting pin" structure according to various implementations.
Figure 10B:
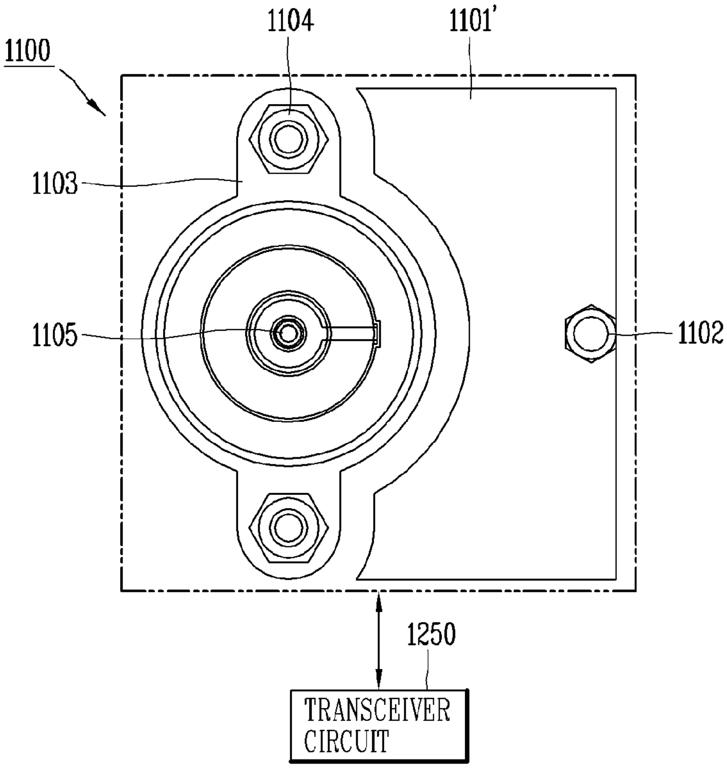

FIGS. 10A and 10B are front views illustrating a cone antenna with a "Cone with single shorting pin" structure according to various implementations. That is, FIGS. 9A and 9B illustrate the cone antenna implemented by one radiator and one shorting pin. Here, the metal patch 1101, 1101' may be disposed only on one side of the cone radiator as illustrated in FIGS. 10A and 10B. In this regard, an inner side of the metal patch 1101 may be formed in a circular shape to correspond to a shape of a circular cone radiator.

The "Cone with single shorting pin" structure as illustrated in FIGS. 10A and 10B may be implemented by one shorting pin (or a shorting supporter). Specifically, FIG. 10A illustrates a shape in which a circular metal patch is disposed at one side of the upper aperture of the cone radiator. On the other hand, FIG. 10B illustrates a shape in which a rectangular metal patch is disposed at one side of the upper aperture of the cone radiator.

Referring to FIGS. 10A and 10B, the electronic device according to the present disclosure may include a cone antenna 1100. The electronic device may further include a transceiver circuit 1250.

Referring to FIGS. 10A and 10B, the cone antenna 1100 may be disposed between a first substrate as an upper substrate and a second substrate as a lower substrate. The cone antenna 1100 may include a metal patch 1101, 1101', 1101*a*, 1101*b*, and a shorting pin 1102. Here, the metal patch 1101 may be disposed at a surrounding area of one side of an upper aperture of the cone antenna 1100. In this regard, the metal patch 1101 may be disposed on the first substrate. Here, the cone antenna 1100 may refer to only a hollow cone antenna or an entire antenna structure including the metal patch 1101.

Specifically, the metal patch 1101, 1101', 1101*a*, 1101*b* may be disposed at the surrounding area of the upper aperture of the cone antenna 1100 and disposed on a top of the first substrate. Accordingly, the metal patch 1101 can be disposed at a position spaced apart from the upper aperture of the cone antenna 1100 in a z-axis by a thickness of the first substrate. As such, when the metal patch 1101 is disposed on the top of the first substrate, the cone antenna 1100 can be advantageously more reduced in size. Specifically, since the first substrate having a predetermined dielectric constant is disposed on an upper area of the cone antenna 1100 including the metal patch 1101, the size of the cone antenna 1100 can be more reduced.

Alternatively, the metal patch 1101, 1101', 1101*a*, 1101*b* may be disposed formed at the surrounding area of the upper aperture of the cone antenna 1100 and disposed on a bottom of the first substrate. Accordingly, the metal patch 1101 can be spaced apart from the upper aperture of the cone antenna 1100 by a predetermined distance on the same plane in the z-axis. As such, when the metal patch 1101 is disposed on the bottom of the first substrate, the first substrate can operate as a radome of the cone antenna 1100 including the metal patch 1101. Accordingly, the cone antenna 1100 including the metal patch 1101 can be protected from outside and a gain of the cone antenna 1100 can be increased.

The shorting pin 1102 may be provided to connect the metal patch 1101, 1101', 1101*a*, 1101*b* and a ground layer GND formed on the second substrate. As such, the size of the cone antenna 1100 can be advantageously reduced by the shorting pin 1102 configured to connect the metal patch 1101 and the ground layer GND formed on the second substrate. The shorting pin 1102 may be provided by one or two in number. A case in which the shorting pin 1102 is provided by one may be most advantageous in terms of miniaturization of the cone antenna 1100. Therefore, the shorting pin 1102 may be provided by one between the metal patch and the second substrate as the lower substrate. However, the number of shorting pins may not be limited thereto, and two or more shorting pins may be used in terms of performance and structural stability of the cone antenna 1100. Depending on applications, remaining pins other than the shorting pin 1102 may be implemented as non-metal supporting pins of a non-metal type.

The transceiver circuit 1250 may be connected to a cone radiator 1100R through a feeder 1105 to radiate a signal through the cone antenna 1100. In this regard, the transceiver circuit 1250, as illustrated in FIG. 4, may include a power amplifier 210 and a low noise amplifier 310 at the front end. Accordingly, the transceiver circuit 1250 may control the power amplifier 210 to radiate a signal, which is amplified through the power amplifier 210, through the cone antenna 1100. Also, the transceiver circuit 1250 may control the low noise amplifier 310 to amplify a signal received from the cone antenna 1100. In addition, the transceiver circuit 1250 may control elements inside the transceiver circuit 1250 to transmit and/or receive signals through the cone antenna 1100.

In this regard, when an electronic device or vehicle includes a plurality of cone antennas, the transceiver circuit 1250 may control signals to be transmitted and/or received through at least one of the plurality of cone antennas. A case in which the transceiver circuit 1250 transmits or receives signals through only one cone antenna may be referred to as 1 Tx or 1 Rx. On the other hand, a case in which the transceiver circuit 1250 transmits or receives signals through two or more cone antennas may be referred to as n Tx or n Rx depending on the number of antennas.

For example, a case in which the transceiver circuit 1250 transmits or receives signals through two cone antennas may be referred to as 2 Tx or 2 Rx. However, a case in which the transceiver circuit 1250 transmits or receives first and second signals each having the same data through two cone antennas may be referred to as 1 Tx or 2 Rx. As such, the case in which the transceiver circuit 1250 transmits or receives the first and second signals each having the same data through the two cone antennas may be referred to as a diversity mode.

Meanwhile, the metal patch 1101 may be configured as a circular patch as illustrated in FIG. 10A. Alternatively, the metal patch 1101 may be configured as a rectangular patch as illustrated in FIG. 10B. In this regard, the metal patch 1101 may be implemented as a circular patch or an arbitrary polygonal patch in view of antenna miniaturization and performance depending on applications. The arbitrary polygonal patch may be approximated to a circular patch as an order of a polygon increases.

Referring to FIG. 10A, the metal patch 1101 may be implemented as a circular patch having an outer side in a circular shape. On the other hand, an inner side of the circular patch may be formed in a circular shape to correspond to a shape of an outline of the upper aperture. Accordingly, a signal radiated from the cone antenna can be coupled through the inner side of the circular patch 1101, thereby optimizing antenna performance.

Referring to FIG. 10B, the metal patch 1101 may be implemented as a rectangular patch having an outer side in a rectangular shape. On the other hand, an inner side of the rectangular patch may be formed in a circular shape to correspond to a shape of an outline of the upper aperture. Accordingly, a signal radiated from the cone antenna can be coupled through the inner side of the rectangular patch 1101, thereby optimizing antenna performance.

Figure 11A:
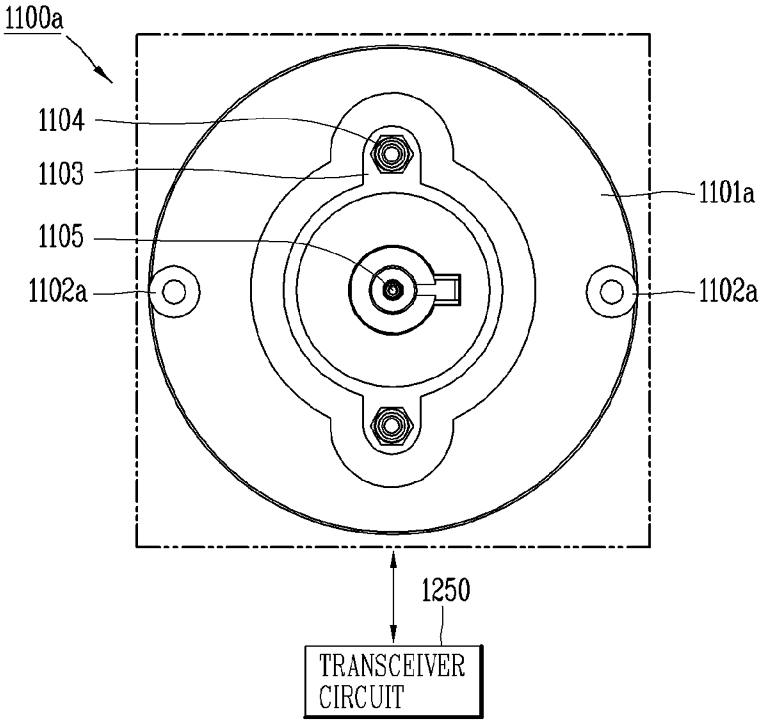
FIGS. 11A and 11B are views of an electronic device having a cone antenna having a "Cone with two shorting pins" structure according to one implementation.
Figure 11B:
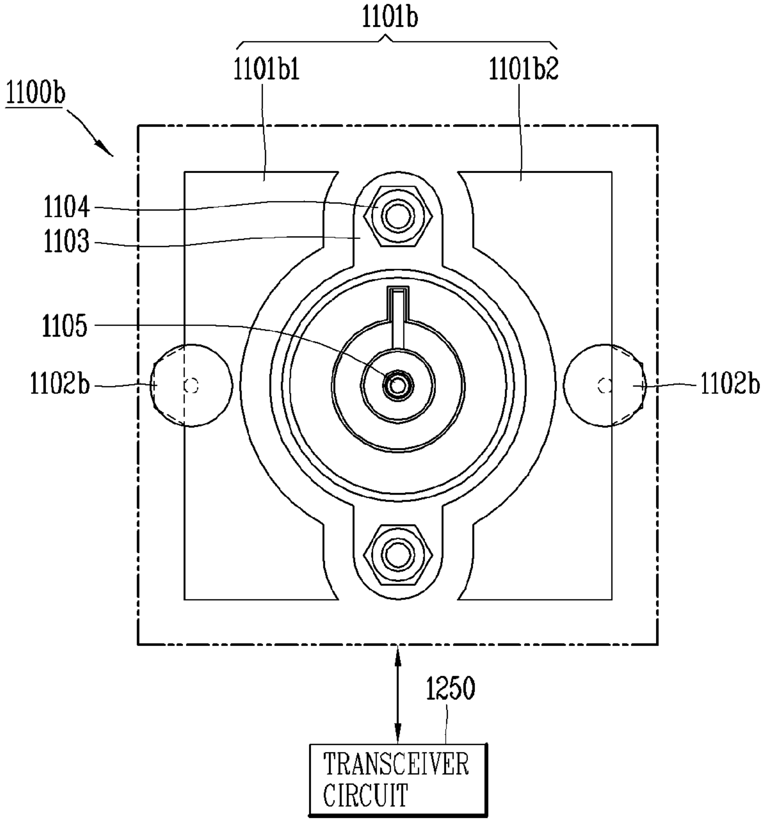

FIGS. 11A and 11B are views of an electronic device having a cone antenna with a "Cone with two shorting pins" structure according to one implementation. In this regard, the "Cone with two shorting pins" structure may be a cone antenna implemented by two shorting pins (or shorting supports). Here, the structure of FIGS. 11A and 11B may not be limited to the "Cone with two shorting pins" structure, and may alternatively be the "Cone with single shorting pin" structure. In this regard, one of two support structures may be implemented as a shorting pin and the other as a non-metal supporter. Specifically, one of shorting pins 1102*a* of FIG. 11A may be replaced with the non-metal supporter 1106 of FIG. 5A. Accordingly, one of the non-metal supporters 1106 may be disposed on the metal patch disposed on another side.

Referring to FIGS. 11A and 11B, an electronic device or vehicle according to the present disclosure may include a cone antenna 1100*a*. The electronic device may further include a transceiver circuit 1250.

Referring to FIGS. 5A to 11B, the cone antenna 1100*a* may be disposed between a first substrate as an upper substrate and a second substrate as a lower substrate. The cone antenna 1100*a* may include a metal patch 1101*a* and shorting pins 1102*a*. Here, the metal patch 1101*a* may be disposed at a surrounding area of an upper aperture of the cone antenna 1100*a*. In this regard, the metal patch 1101 may be disposed on the first substrate.

The metal patch 1101*a* may be implemented as a circular patch to surround the entire upper aperture of the cone antenna 1100*a*. However, the metal path 1101*a* may not be limited thereto, and may alternatively be implemented as a circular patch to surround a part of the upper aperture of the cone antenna 1100*a*. Accordingly, the circular patch may be disposed at each of both sides of the upper aperture of the cone antenna 1100*a* or may be disposed at one side.

Accordingly, in the cone antenna 1100*a* according to the present disclosure, the circular patch 1101*a* may be disposed at an entire area to surround the entire upper aperture of the cone antenna 1100*a*. Specifically, the metal patch such as the circular patch 1101*a* may be disposed at both of one side and another side opposite to the one side so as to surround the entire area of the upper aperture of the cone antenna.

Therefore, an overall size of the cone antenna 1100*a* having the circular patch 1101*a* and the shorting pin 1102*a* in a symmetric form may be slightly increased compared to that of a cone antenna having a metal path disposed only at one side. However, the cone antenna 1100*a* having the circular patch 1101*a* and the shorting pins 1102*a* in the symmetric form can advantageously implement a symmetric radiation pattern and broadband characteristics.

Meanwhile, in the cone antenna 1100*a* according to the present disclosure, the circular patch 1101*a* may be disposed to surround a partial area of the upper aperture. Accordingly, the size of the cone antenna 1100*a* including the metal patch 1101*a* can be minimized.

Specifically, the metal patch 1101*a* may be disposed at the surrounding area of the upper aperture of the cone antenna 1100*a* and disposed on a top of the first substrate. Accordingly, the metal patch 1101*a* can be disposed at a position spaced apart from the upper aperture of the cone antenna 1100*a* in a z-axis by a thickness of the first substrate. As such, when the metal patch 1101*a* is disposed on the top of the first substrate, the cone antenna 1100*a* can be more reduced in size. Specifically, since the first substrate having a predetermined dielectric constant is disposed on an upper area of the cone antenna 1100*a* including the metal patch 1101*a*, the size of the cone antenna 1100*a* can be more reduced.

Or, the metal patch 1101*a* may be disposed at the surrounding area of the upper aperture of the cone antenna 1100*a* and provided on a bottom of the first substrate. Accordingly, the metal patch 1101*a* can be spaced apart from the upper aperture of the cone antenna 1100*a* by a predetermined distance on the same plane in the z-axis. As such, when the metal patch 1101*a* is disposed on the bottom of the first substrate, the first substrate can operate as a radome of the cone antenna 1100*a* including the metal patch 1101*a*. Accordingly, the cone antenna 1100*a* including the metal patch 1101a can be protected from outside and a gain of the cone antenna 1100a can be increased.

The shorting pins 1102a may be provided to connect the metal patch 1101a and a ground layer GND formed on the second substrate. As such, the size of the cone antenna 1100a can be advantageously reduced by the shorting pins 1102a configured to connect the metal patch 1101a and the ground layer GND formed on the second substrate.

Referring to FIG. 11A, the metal patch 1101a may be implemented as a circular patch having an outer side in a circular shape. On the other hand, an inner side of the circular patch may be formed in a circular shape to correspond to a shape of an outline of the upper aperture. Accordingly, a signal radiated from the cone antenna can be coupled through the inner side of the circular patch 1101a, thereby optimizing antenna performance.

Meanwhile, a resonance length may be defined by an aperture of the metal patch 1101a which is larger than the upper aperture of the cone antenna. Thus, a signal radiated from the cone antenna 1100a can be coupled through the inner side of the circular patch 1101a. Accordingly, the cone antenna 1100a can be reduced in size by the aperture of the circular patch 1101a larger than the upper aperture of the cone antenna.

On the other hand, FIG. 11B illustrates an electronic device having a cone antenna with a “Cone with two shorting pins” structure according to one implementation. In this regard, the “Cone with two shorting pins” structure may be a cone antenna implemented by two shorting pins (or shorting supports). Here, the structure of FIGS. 11A and 11B may not be limited to the “Cone with two shorting pins” structure, and may alternatively be the “Cone with single shorting pin” structure. In this regard, one of the two support structures may be implemented as a shorting pin and the other as a non-metal supporter. Specifically, one of the shorting pins 1102b of FIG. 11A may be replaced with the non-metal supporter 1106 of FIG. 5A. Accordingly, one of the non-metal supporters 1106 may be disposed on a metal patch 1101b1 disposed on another side.

Referring to FIG. 11B, an electronic device according to the present disclosure may include a cone antenna 1100b. The electronic device may further include a transceiver circuit 1250.

Referring to FIGS. 5A to 11B, the cone antenna 1100b may be disposed between a first substrate as an upper substrate and a second substrate as a lower substrate. The cone antenna 1100b may include a metal patch 1101b and shorting pins 1102b. Here, the metal patch 1101b may be disposed at a surrounding area of an upper aperture of the cone antenna 1100b. In this regard, the metal patch 1101 may be disposed on the first substrate.

The metal patch 1101b may be implemented as a rectangular patch to surround the entire upper aperture of the cone antenna 1100b. However, the metal path 1101b may not be limited thereto, and may alternatively be implemented as a rectangular patch to surround a part of the upper aperture of the cone antenna 1100b. Accordingly, the rectangular patch may be disposed at each of both sides of the upper aperture of the cone antenna 1100b or may be disposed at one side.

Accordingly, in the cone antenna 1100b according to the present disclosure, the circular patch 1101b may be disposed at an entire area to surround the entire upper aperture of the cone antenna 1100b. In this regard, in order to reduce a size of the rectangular patch 1101b, the rectangular patch 1101b may not be disposed at surrounding areas of fasteners 1104 that support the cone antenna 1100b. Accordingly, the rectangular patch 1101b may be disposed at each of a left area and a right area of the cone antenna 1100b.

In this regard, the metal patch 1101b may include a first metal patch 1101b1 and a second metal patch 1101b2. Specifically, the first metal patch 1101b1 may be disposed at the left side of the upper aperture of the cone antenna 1100b to surround the upper aperture. Also, the second metal patch 1101b2 may be disposed at the right side of the upper aperture of the cone antenna 1100b to surround the upper aperture.

Accordingly, the first metal patch 1101b1 and the second metal patch 1101b2 may be configured to divide a metal pattern, thereby reducing an overall size of the antenna. In this regard, when the first metal patch 1101b1 and the second metal patch 1101b2 are connected to each other, the metal patch 1101b may partially operate as a radiator. Accordingly, a bandwidth of the cone antenna 1100b may be partially limited due to unwanted resonance caused by the affection of the metal patch 1101b having a narrower bandwidth than the cone antenna 1100b.

In order to prevent such bandwidth limitation, the first metal patch 1101b1 and the second metal patch 1101b2 may be configured to divide the metal pattern. Accordingly, the cone antenna 1100b in which the metal pattern is divided by the first metal patch 1101b1 and the second metal patch 1101b2 can operate as a broadband antenna. Accordingly, the first metal patch 1101b1 and the second metal patch 1101b2 may not be disposed at areas corresponding to outer rims 1103 defining the upper aperture.

Specifically, the rectangular patch 1101b may be disposed at the surrounding area of the upper aperture of the cone antenna 1100b and provided on a top of the first substrate. Accordingly, the metal patch 1101b can be disposed at a position spaced apart from the upper aperture of the cone antenna 1100b in a z-axis by a thickness of the first substrate. As such, when the metal patch 1101b is disposed on the top of the first substrate, the cone antenna 1100b can be more reduced in size. Specifically, since the first substrate having a predetermined dielectric constant is disposed on an upper area of the cone antenna 1100b including the metal patch 1101b, the size of the cone antenna 1100b can be more reduced.

Or, the rectangular patch 1101b may be disposed at the surrounding area of the upper aperture of the cone antenna 1100b and provided on a bottom of the first substrate. Accordingly, the metal patch 1101b can be spaced apart from the upper aperture of the cone antenna 1100b by a predetermined distance on the same plane in the z-axis. As such, when the metal patch 1101b is disposed on the bottom of the first substrate, the first substrate can operate as a radome of the cone antenna 1100b including the metal patch 1101b. Accordingly, the cone antenna 1100b including the metal patch 1101b can be protected from outside and a gain of the cone antenna 1100b can be increased.

The shorting pins 1102b may be provided to connect the metal patch 1101b and a ground layer GND disposed on the second substrate. As such, the size of the cone antenna 1100a can be advantageously reduced by the shorting pins 1102a configured to connect the metal patch 1101a and the ground layer GND formed on the second substrate.

Referring to FIG. 11B, the metal patch 1101b may be implemented as a rectangular patch having an outer side in a rectangular shape. On the other hand, an inner side of the rectangular patch may be formed in a circular shape to correspond to a shape of an outline of the upper aperture. Accordingly, a signal radiated from the cone antenna can be coupled through the inner side of the rectangular patch 1101*b*, thereby optimizing antenna performance.

Meanwhile, a resonance length may be defined by a circular aperture of the rectangular patch 1101*b* which is larger than the upper aperture of the cone antenna. Thus, a signal radiated from the cone antenna 1100*b* can be coupled through the inner side of the rectangular patch 1101*b*. Accordingly, the cone antenna 1100*b* can be reduced in size by the circular aperture of the rectangular patch 1101*b* larger than the upper aperture of the cone antenna.

Meanwhile, referring to FIGS. 5A to 11B, the metal patch 1101, 1101', 1101*a*, 1101*b* may be disposed on a front surface of the first substrate S1, and a signal may be radiated from the cone radiator 1100R by being coupled through the metal patch 1101, 1101', 1101*a*, 1101*b*. Accordingly, the metal patch 1101, 1100', 1100*a*, and 1100*b* may be disposed at one side or at both of one side and another side of the cone radiator 1100R to surround at least part of the upper aperture of the cone radiator 1100R.

Meanwhile, referring to FIGS. 5A to 11B, the cone antenna assemblies 1100X and 1100Y each may further include a feeder 1105 disposed on the second substrate S2 as the lower substrate to transmit a signal through a lower aperture. In this regard, FIG. 12 is a view illustrating a structure of fastening a feeder for feeding a cone antenna to the cone antenna and a shape of the feeder according to the present disclosure.

Figure 12:
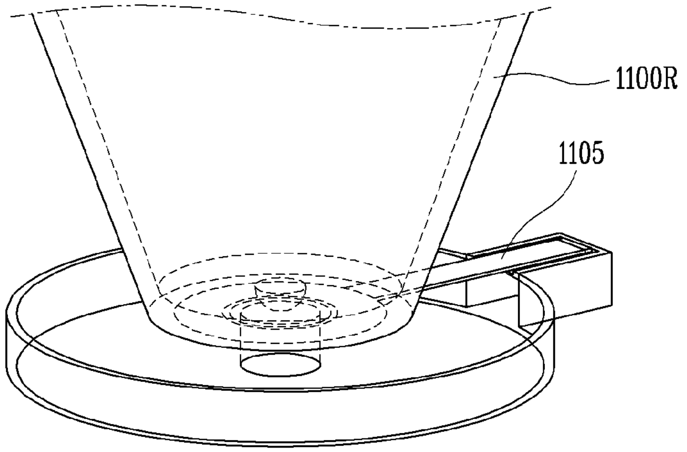
FIG. 12 is a view illustrating a structure of fastening a feeder for feeding a cone antenna to the cone antenna and a shape of the feeder according to the present disclosure.
Figure 12:
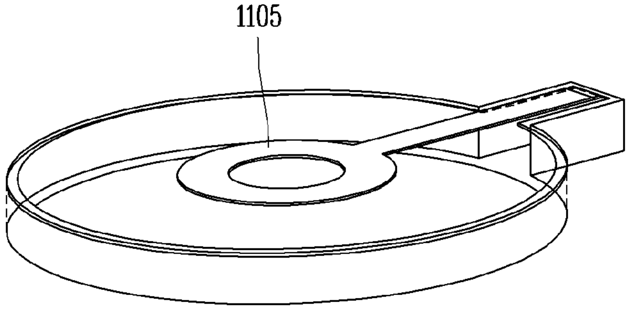

Specifically, (a) of FIG. 12 illustrates a structure of fastening a feeder for feeding a cone antenna to the cone antenna according to the present disclosure. In addition, (b) of FIG. 12 illustrates the feeder that feeds the cone antenna and has a shape corresponding to a shape of the cone antenna.

Referring to FIG. 12, the feeder 1105 may be formed in a shape corresponding to the shape of the cone radiator 1100R on the second substrate S2 as the lower substrate, that is, an end portion of the feeder 1105 may be formed in a ring shape. Meanwhile, a fastener such as a screw or a bolt may be inserted into the feeder 1105 to fix the cone radiator 1100R to the lower substrate. In this regard, the fastener such as the screw or the bolt may be inserted into an inner space of the cone radiator 1100R from the lower substrate for assembly convenience. Alternatively, the fastener such as the screw or the bolt may be fastened to the lower substrate from the inner space of the cone radiator 1100R.

Accordingly, the feeder 1105 may transmit a signal through the lower aperture of the cone radiator 1100R and radiate a signal through the upper aperture of the cone antenna and the metal patch 1101, 1101*a*, 1101*b*. On the other hand, the feeder 1105 may be soldered on the second substrate S2. Accordingly, a signal from a signal line disposed on the second substrate S2 can be transmitted to the cone radiator 1100R through the feeder 1105.

Referring to FIGS. 5A to 12, the cone antenna assembly 1100X, 1100Y may further include a shorting pin 1102 to connect the metal patch 1101, 1101', 1101*a*, 1101*b* and the ground formed on the second substrate S2. In this regard, the shorting pin 1102 can be provided by one to advantageously prevent a generation of a null of a radiation pattern in an elevation direction.

Meanwhile, the antenna system including the cone antenna assembly 1100X, 1100Y according to the present disclosure described above may be mounted on an electronic device or a vehicle. Here, the electronic device may be a router such as a Customer Premises Equipment (CPE) in addition to a mobile terminal.

Figure 13:
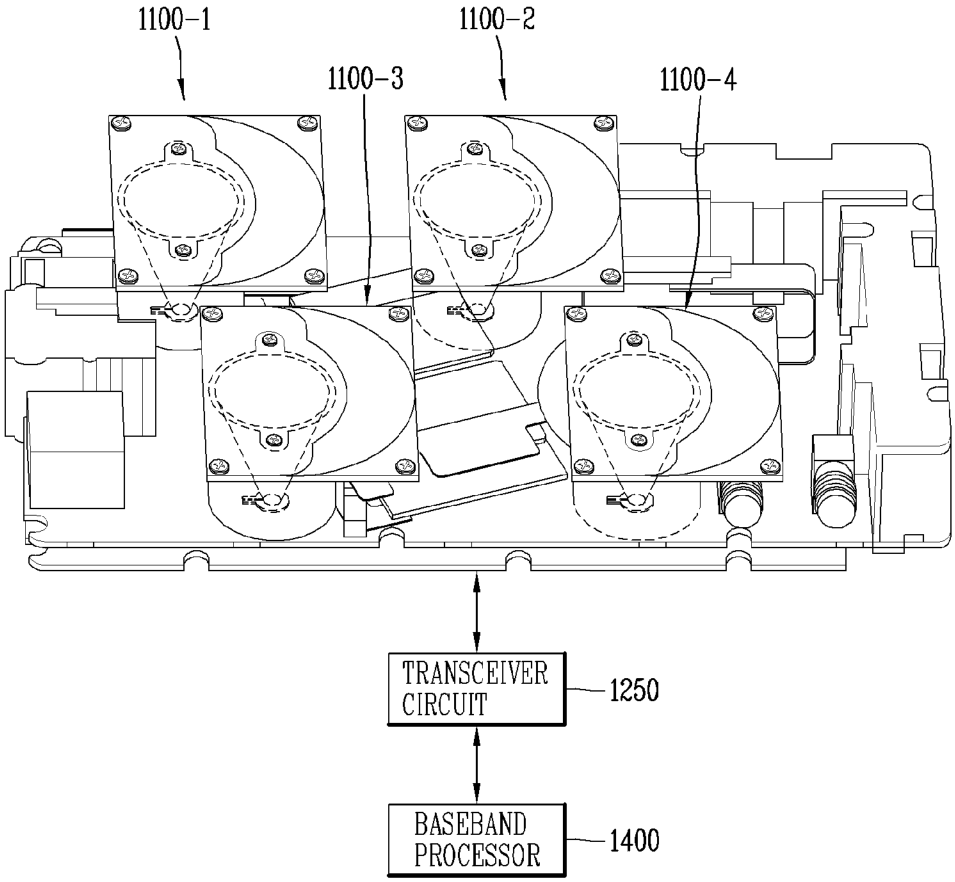
FIG. 13 is a view illustrating one example of an electronic device including a plurality of cone antenna assemblies, a transceiver circuit, and a processor in accordance with the present disclosure.
Figure 14:
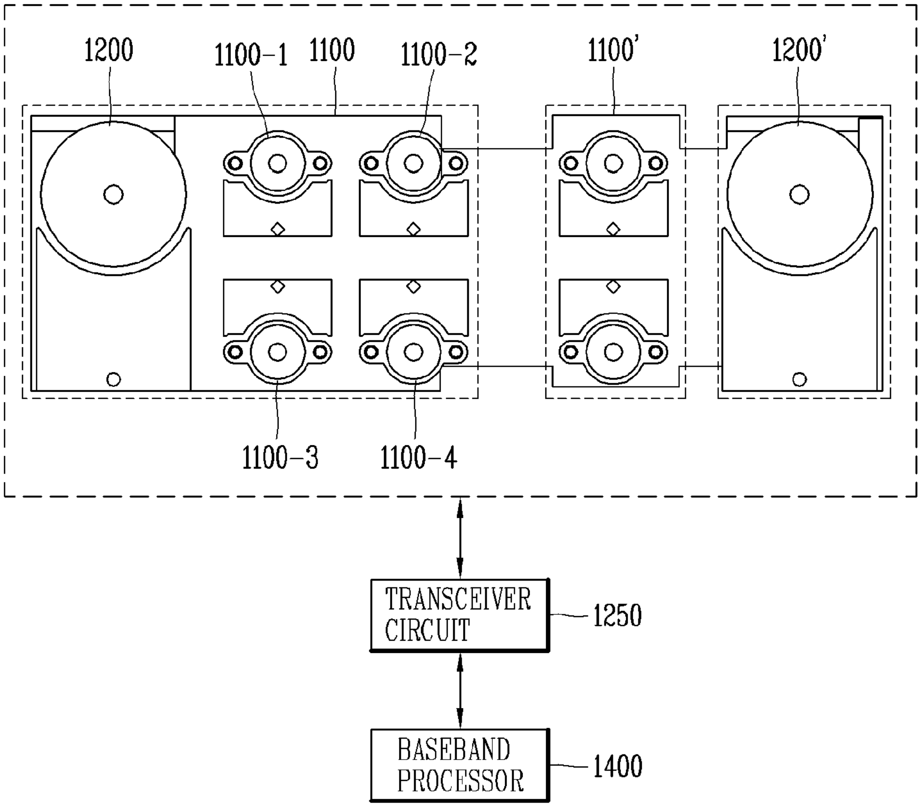
FIG. 14 is a view illustrating one example of a vehicle having a plurality of cone antennas, a transceiver circuit, and a processor in accordance with the present disclosure.

FIG. 13 is a view illustrating one example of an electronic device including a plurality of cone antenna assemblies, a transceiver circuit, and a processor in accordance with the present disclosure. FIG. 14 is a view illustrating one example of a vehicle having a plurality of cone antennas, a transceiver circuit, and a processor in accordance with the present disclosure. In this regard, the description of FIGS. 1 to 12 may be applied to the electronic device and the vehicle of FIGS. 13 and 14.

Referring to FIG. 13, the electronic device or vehicle may include four cone antennas, that is, a first cone antenna 1100-1 to a fourth cone antenna 1100-4. Here, the number of cone antennas may vary depending on applications. The first cone antenna 1100-1 to the fourth cone antenna 1100-4 may be implemented in the same shape for the same antenna performance. The first cone antenna 1100-1 to the fourth cone antenna 1100-4 may be implemented in different shapes for optimal antenna performance and optimal arrangement structure. The first cone antenna 1100-1 to the fourth cone antenna 1100-4 may be disposed to be shifted by predetermined distances from one another for optimal antenna performance and reduction of a mutual interference level.

Here, the electronic device may be implemented in a communication relay apparatus, a small cell base station, or a base station, in addition to a User Equipment (UE). Here, the communication relay apparatus may be a Customer Premises Equipment (CPE) capable of providing 5G communication services indoors. The vehicle may also be configured to perform communication with a 4G base station or a 5G base station or may be configured to perform communications with adjacent vehicles directly or via a peripheral device.

Referring to FIGS. 5A to 13, the antenna system 1000 may include a plurality of cone antenna assemblies 1100X, 1100Y. Also, the antenna system 1000 may include a plurality of cone antennas, and a transceiver circuit 1250, and a baseband processor 1400 both connected to the antennas.

The cone antenna assemblies 1100X and 1100Y each may include the cone radiator 1100R-1, 1100R that is disposed between the first substrate S1 and the second substrate S2, has an upper portion connected to the first substrate S1 and a lower portion connected to the second substrate S2, and has an upper aperture. Here, the first substrate S1 may correspond to the upper substrate and the second substrate S2 may correspond to the lower substrate. The second substrate S2 may be spaced apart from the first substrate S1 by a predetermined distance and may include the ground layer GND.

The cone antenna assemblies 1100X and 1100Y each may further include the antenna frame 1100F-1, 1100F-2 formed of a dielectric material and fastened to the second substrate S2 together with the cone radiator 1100R-1, 1100R.

For example, the upper aperture and the lower aperture of the cone radiator 1100R-1 may be formed in a rectangular shape. The antenna frame 1100F-1 may be accommodated in the cone radiator 1100R-1. Accordingly, the supporter 1100S integrally formed with the antenna frame 1100F-1 may be fastened to the second substrate S2 to fix and support the cone radiator 1100R-1.

As another example, the antenna frame 1100F-2 may be formed by insert-injection to accommodate the cone radiator 1100R. A plurality of bolt accommodating portions may be formed in the antenna frame 1100F-2, and the first substrate S1 and the antenna frame 1100F-2 may be fixed by bolts accommodated in the bolt accommodating portions.

On the other hand, the transceiver circuit 1250 may be connected to the cone radiator 1100R-1, 1100R through the feeding unit 1105, and configured to radiate a signal through the cone radiator 1100R-1, 1100R. The baseband processor 1400 may perform communication with at least one of an adjacent electronic device and a base station through the transceiver circuit 1250.

In this regard, the transceiver circuit 1250 may be connected to the cone radiator 1100R through the feeder 1105. Also, the transceiver circuit 1250 may control a first signal of a first frequency band to be radiated through the cone antenna 1110. Also, the transceiver circuit 1250 may control a second signal of a second frequency band lower than the first frequency band to be radiated through the cone antenna 1110.

In this regard, the baseband processor 1400 may control the transceiver circuit 1250 to perform multiple input/multiple output (MIMO) through two or more of the plurality of cone antennas 1100-1 to 1100-4.

When a resource of the first frequency band is allocated to the electronic device, the processor 1400 may control the transceiver circuit 1250 to perform MIMO through two or more of the plurality of cone antennas 1100-1 to 1100-4. To this end, when the resource of the first frequency band is allocated to the vehicle, the processor 1400 may control the transceiver circuit 1250 to operate in the first frequency band. In this regard, the processor 1400 may deactivate some components of the transceiver circuit 1250 operating in the second frequency band.

On the other hand, when a resource of the second frequency band is allocated to the electronic device, the processor 1400 may control the transceiver circuit 1250 to perform MIMO through two or more of the plurality of cone antennas 1100-1 to 1100-4. To this end, when the resource of the second frequency band is allocated to the vehicle, the processor 1400 may control the transceiver circuit 1250 to operate in the second frequency band. In this regard, the processor 1400 may deactivate some components of the transceiver circuit 1250 operating in the first frequency band.

Meanwhile, when the resources of both the first frequency band and the second frequency band are allocated to the electronic device, the processor 1400 may use only one cone antenna. To this end, the processor 1400 may control the transceiver circuit 1250 to perform carrier aggregation (CA) on the first signal and the second signal received through the one cone antenna. Accordingly, the processor 1400 can simultaneously acquire both first and second information included in the first and second signals, respectively.

Referring to FIGS. 2 to 12 and FIG. 14, the antenna system 1000 may include a plurality of cone antenna assemblies 1100X, 1100Y. Also, the antenna system 1000 may include a plurality of cone antennas, and a transceiver circuit 1250 and a baseband processor 1400 both connected to the antennas.

The cone antenna assemblies 1100X, 1100Y each may include the cone radiator 1100R-1, 1100R that is disposed between the first substrate S1 and the second substrate S2, has an upper portion connected to the first substrate S1 and a lower portion connected to the second substrate S2, and has an upper aperture. Here, the first substrate S1 may correspond to the upper substrate and the second substrate S2 may correspond to the lower substrate. The second substrate S2 may be spaced apart from the first substrate S1 by a predetermined distance and may include a ground layer GND.

The cone antenna assemblies 1100X, 1100Y each may further include the antenna frame 1100F-1, 1100F-2 formed of a dielectric material and fastened to the second substrate S2 together with the cone radiator 1100R-1, 1100R.

For example, the upper aperture and the lower aperture of the cone radiator 1100R-1 may be formed in a rectangular shape. The antenna frame 1100F-1 may be accommodated in the cone radiator 1100R-1. Accordingly, the supporter 1100S integrally formed with the antenna frame 1100F-1 can be fastened to the second substrate S2 to fix and support the cone radiator 1100R-1.

As another example, the antenna frame 1100F-2 may be formed by insert-injection to accommodate the cone radiator 1100R. The plurality of bolt accommodating portions may be formed in the antenna frame 1100F-2, and the first substrate S1 and the antenna frame 1100F-2 may be fixed by bolts accommodated in the bolt accommodating portions.

Meanwhile, referring to FIGS. 2 to 12 and FIG. 14, the antenna system 1000 disposed in the vehicle may include a plurality of cone antenna assemblies, for example, the first cone antenna 1100-1 to the fourth cone antenna 1100-4. Specifically, the plurality of cone antennas, namely, the first to fourth cone antennas 1100-1 to 1100-4 may be disposed on an upper left portion, an upper right portion, a lower left portion, and a lower right portion of the antenna system 1100 in the vehicle. The plurality of cone antennas 1100-1 to 1100-4 each may include the metal patch 1101-1, 1101-2, the cone radiator 1100R, and the feeder 1105.

Also, the antenna system 1000 disposed in the vehicle may further include the transceiver circuit 1250. The antenna system 1000 disposed in the vehicle may further include the baseband processor 1400.

On the other hand, the transceiver circuit 1250 may be connected to the cone radiator 1100R-1, 1100R through the feeding unit 1105 and configured to radiate a signal through the cone radiator 1100R-1, 1100R. The baseband processor 1400 may perform communication with at least one of an adjacent vehicle, a Road Side Unit (RSU), and a base station through the transceiver circuit 1250.

In this regard, the transceiver circuit 1250 may be connected to the cone radiator 1100R, 1100R-1 through the feeder 1105. Also, the transceiver circuit 1250 may control a first signal of a first frequency band to be radiated through the cone antenna 1100. Also, the transceiver circuit 1250 may control a second signal of a second frequency band lower than the first frequency band to be radiated through the cone antenna 1110.

In this regard, the baseband processor 1400 may control the transceiver circuit 1250 to perform Multiple Input/Multiple Output (MIMO) through two or more of the plurality of cone antennas 1100-1 to 1100-4.

When a resource of the first frequency band is allocated to the vehicle, the processor 1400 may control the transceiver circuit 1250 to perform MIMO through two or more of the plurality of cone antennas 1100-1 to 1100-4. To this end, when the resource of the first frequency band is allocated to the vehicle, the processor 1400 may control the transceiver circuit 1250 to operate in the first frequency band. In this regard, the processor 1400 may deactivate some components of the transceiver circuit 1250 operating in the second frequency band.

On the other hand, when a resource of the second frequency band is allocated to the vehicle, the processor 1400 may control the transceiver circuit 1250 to perform MIMO through two or more of the plurality of cone antennas 1100-1 to 1100-4. To this end, when the resource of the second frequency band is allocated to the vehicle, the processor 1400 may control the transceiver circuit 1250 to operate in the second frequency band. In this regard, the processor 1400 may deactivate some components of the transceiver circuit 1250 operating in the first frequency band.

Meanwhile, when the resources of both the first frequency band and the second frequency band are allocated to the vehicle, the processor 1400 may use only one cone antenna. To this end, the processor 1400 may control the transceiver circuit 1250 to perform Carrier Aggregation (CA) on the first signal and the second signal received through the one cone antenna. Accordingly, the processor 1400 can simultaneously acquire both first and second information included in the first and second signals, respectively.

On the other hand, the antenna system 1000 may further include second type cone antennas 1200 and 1200' spaced apart predetermined intervals from the plurality of cone antennas 1100 and operating in a second frequency band lower than the frequency band of the plurality of cone antennas 1100.

Accordingly, the baseband processor 1400 may perform a MIMO or diversity operation in a first frequency band including a middle band (MB) and a high band (HB) through the plurality of cone antennas 1100-1 to 1100-4. Alternatively, the baseband processor 1400 may perform the MIMO or diversity operation in the first frequency band including the middle band (MB) and the high band (HB) through a plurality of cone antennas 1100-1 to 1100-4 and 1100'. Accordingly, a mutual interference level due to the MIMO can be reduced by using the cone antennas 1100' spaced apart from the cone antennas 1100-1 to 1100-4.

Also, the baseband processor 1400 may perform the MIMO or diversity operation in a low band LB as the second frequency band through the second type cone antennas 1200 and 1200'. Specifically, the baseband processor 1400 may perform the MIMO or diversity operation in the second frequency band through the second type cone antennas 1200 and 1200'.

The foregoing description has been given of the electronic device or vehicle having the cone antennas according to the present disclosure. Technical effects of the electronic device or vehicle having such cone antennas will be described as follows.

The present disclosure can provide a structure capable of fixing and fastening a cone radiator to a circuit board and structures while providing a cone antenna assembly operating in wide frequency bands from a low frequency band to a 5G Sub 6 band.

Also, the present disclosure can provide a cone antenna assembly operating in wide frequency bands from a low frequency band to a 5G Sub 6 band and can improve assembly convenience of the cone antenna assembly.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the present disclosure described above, cone antenna assemblies, manufacturing of the cone antenna assemblies, and designs and operations of configurations performing controls for an antenna system including cone antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A cone antenna assembly comprising:
- a first substrate;
- a second substrate spaced apart from the first substrate by a predetermined distance and having a ground layer;
- a cone radiator provided between the first substrate and the second substrate, having an upper portion connected to the first substrate and a lower portion connected to the second substrate, and having an upper aperture;
- a feeder disposed on the second substrate to transmit a signal through a lower aperture;
- an antenna frame formed of a dielectric material and fastened to the second substrate together with the cone radiator,
- wherein the antenna frame is accommodated inside the cone radiator;
- a supporter integrally formed with the antenna frame is fastened to the second substrate to fix and support the cone radiator outside the cone radiator; and
- a metal patch disposed on a front surface of the first substrate, wherein the signal from the feeder is radiated through the dielectric material of the antenna frame inside the cone radiator to be coupled to the metal patch.

2. The cone antenna assembly of claim 1, wherein the cone radiator has the upper aperture and a lower aperture each formed in a circular shape, an oval shape, or a polygonal shape.

3. The cone antenna assembly of claim 1,
- wherein an upper portion of the antenna frame, the upper aperture and a lower aperture of the cone radiator are formed in a rectangular shape, and
- wherein the metal patch is implemented as a rectangular patch having an outer side in a rectangular shape.

4. The cone antenna assembly of claim 3, wherein the supporter is connected to the second substrate through side apertures formed through side surfaces of the cone radiator, and
- wherein the second substrate and the supporter are fixed by fasteners inserted into the supporter from a rear surface of the second substrate.

5. The cone antenna assembly of claim 3, wherein the cone radiator is formed by press working, and
- wherein the antenna frame is formed by injection molding, and a lower fixture integrally formed with the antenna frame is fastened to the second substrate to fix and support the cone radiator.

6. The cone antenna assembly of claim 1, wherein an outer fixture of the cone radiator is fixed by being soldered on a ground formed on a bottom of the first substrate.

7. The cone antenna assembly of claim 1, wherein the antenna frame is formed by insert-injection to accommodate the cone radiator, and wherein a plurality of bolt accommodating portions are formed in the antenna frame, and the first substrate and the antenna frame are fixed by bolts accommodated in the bolt accommodating portions.

8. The cone antenna assembly of claim 7, wherein the second substrate and the antenna frame are fixed by bolts accommodated in the plurality of bolt accommodating portions from a rear surface of the second substrate.

9. The cone antenna assembly of claim 7, further comprising a shorting pin configured to connect the metal patch and the ground formed on the second substrate, wherein the shorting pin is provided as a single shorting pin to prevent a null of a radiation pattern from being generated in an elevation direction.

10. The cone antenna assembly of claim 1, wherein the cone radiator further comprises:

a plurality of outer rims defining the upper aperture of the cone radiator and connecting the cone radiator to the first substrate; and a plurality of bolt accommodating portions formed in the outer rims such that the outer rims are connected to the first substrate, and wherein the first substrate and the cone radiator are fixed by a plurality of fasteners accommodated in the bolt accommodating portions.

11. The cone antenna assembly of claim 1, wherein the feeder is formed in a ring shape corresponding to a shape of the lower aperture.

12. The cone antenna assembly of claim 11, wherein the feeder is soldered on the second substrate, such that a signal from a signal line disposed on the second substrate is transmitted to the cone radiator through the feeder.

13. An electronic device having a cone antenna assembly, the electronic device comprising:

a cone antenna assembly that comprises:

a first substrate;

a second substrate spaced apart from the first substrate by a predetermined distance and having a ground layer;

a cone radiator provided between the first substrate and the second substrate, having an upper portion connected to the first substrate and a lower portion connected to the second substrate, and having an upper aperture; and an antenna frame formed of a dielectric material and fastened to the second substrate together with the cone radiator; and a transceiver circuit connected to the cone radiator through a feeder and configured to control a signal to be radiated through the cone radiator, wherein the feeder is disposed on the second substrate to transmit a signal through a lower aperture, wherein the antenna frame is accommodated inside the cone radiator;

a supporter integrally formed with the antenna frame is fastened to the second substrate to fix and support the cone radiator outside the cone radiator; and a metal patch disposed on a front surface of the first substrate, wherein the signal from the feeder is radiated through the dielectric material of the antenna frame inside the cone radiator to be coupled to the metal patch.

14. The electronic device of claim 13, wherein the upper aperture and a lower aperture of the cone radiator are formed in a rectangular shape.

15. The electronic device of claim 13, wherein the antenna frame is formed by insert-injection to accommodate the cone radiator, and wherein a plurality of bolt accommodating portions are formed in the antenna frame, and the first substrate and the antenna frame are fixed by bolts accommodated in the bolt accommodating portions.

16. A vehicle having a cone antenna assembly, the vehicle comprising:

a cone antenna assembly that comprises:

a first substrate;

a second substrate spaced apart from the first substrate by a predetermined distance and having a ground layer;

a cone radiator provided between the first substrate and the second substrate, having an upper portion connected to the first substrate and a lower portion connected to the second substrate, and having an upper aperture;

an antenna frame formed of a dielectric material and fastened to the second substrate together with the cone radiator;

a metal patch disposed on a front surface of the first substrate, wherein the signal from the feeder is radiated through the dielectric material of the antenna frame inside the cone radiator to be coupled to the metal patch, and wherein the antenna frame is accommodated inside the cone radiator; and a supporter integrally formed with the antenna frame is fastened to the second substrate to fix and support the cone radiator;

a transceiver circuit connected to the cone radiator through a feeder and configured to control a signal to be radiated through the cone radiator, wherein the feeder is disposed on the second substrate to transmit a signal through a lower aperture; and a baseband processor configured to perform communication with at least one of an adjacent vehicle, a Road Side Unit (RSU), or a base station via the transceiver circuit.

17. The vehicle of claim 16, wherein the upper aperture and a lower aperture of the cone radiator are formed in a rectangular shape.

18. The vehicle of claim 16, wherein the antenna frame is formed by insert-injection to accommodate the cone radiator, and wherein a plurality of bolt accommodating portions are formed in the antenna frame, and the first substrate and the antenna frame are fixed by bolts accommodated in the bolt accommodating portions.

* * * * *